US010083530B1

(12) United States Patent
Maswadeh et al.

(10) Patent No.: US 10,083,530 B1
(45) Date of Patent: Sep. 25, 2018

(54) MULTIVARIATE DIGITAL DISPLAY DEVICE AND METHOD FOR INCREASING THE SEPARATION BETWEEN CLASSES' DATA POINTS IN HYPERSPACE

(71) Applicant: U.S. Army Edgewood Chemical and Biological Center, APG, MD (US)

(72) Inventors: Waleed M Maswadeh, Rosedale, MD (US); Arnold P. Snyder, Bel Air, MD (US)

(73) Assignee: The United States of America as Represented by the Secretary of the Army, Washington, DC (US)

(*) Notice: Subject to any disclaimer, the term of this patent is extended or adjusted under 35 U.S.C. 154(b) by 0 days.

(21) Appl. No.: 15/331,276

(22) Filed: Oct. 21, 2016

(51) Int. Cl.
*G06T 11/20* (2006.01)
*G06K 9/62* (2006.01)
*G06K 9/52* (2006.01)
*G06T 15/20* (2011.01)

(52) U.S. Cl.
CPC ............... *G06T 11/20* (2013.01); *G06K 9/52* (2013.01); *G06K 9/6267* (2013.01); *G06T 11/206* (2013.01); *G06T 15/20* (2013.01)

(58) Field of Classification Search
CPC ....... G06T 11/20; G06T 11/206; G06T 15/20; G06K 9/52; G06K 9/6267; G06F 19/266
USPC .......................... 345/440, 441; 706/20; 703/2
See application file for complete search history.

(56) References Cited

U.S. PATENT DOCUMENTS

| | | | |
|---|---|---|---|
| 5,442,716 A * | 8/1995 | Otsu | G06K 9/52 382/181 |
| 7,389,208 B1 * | 6/2008 | Solinsky | G06K 9/6232 382/115 |
| 7,945,627 B1 * | 5/2011 | Musat | G06Q 10/107 709/200 |
| 8,982,131 B1 | 3/2015 | Maswadeh | |
| 2002/0111742 A1 * | 8/2002 | Rocke | G06F 19/24 702/19 |
| 2004/0183800 A1 * | 9/2004 | Peterson | G06T 11/206 345/440 |
| 2014/0162370 A1 * | 6/2014 | Ling | G01N 33/6893 436/86 |

(Continued)

OTHER PUBLICATIONS

Maswadeh, W. et al., "Evaluation of the Degree of Separation Between Two Data Populations With Statistical Algorithms", Research and Technology Directorate, Apr. 2012, p. 1-38.*

*Primary Examiner* — Chante Harrison
(74) *Attorney, Agent, or Firm* — Ulysses John Biffoni

(57) ABSTRACT

A multivariate digital separation of classes and display device and method for generating pictures of data set comprised of points in hyperspace. An input device may include a keyboard, a laboratory instrument such as a mass spectrometer, a reader of computer readable medium, or a network interface device. An output device may include a monitor used in conjunction with either a 2D or 3D printer or both. A computer processor receives data from the input device and performs a series of steps to create a 2D or 3D image of the pairs-hyperspace of all pairs of classes in data set. The resulting image is then produced in a non-transitory medium by at least one of the output devices. The processor steps include the use of maximizing the degree of separation between all classes in the data set as well as transformation of separated data points of all classes into pairs-hyperspace.

7 Claims, 42 Drawing Sheets

(56) References Cited

U.S. PATENT DOCUMENTS

2015/0310643 A1* 10/2015 Rzeszotarski .......... G06T 13/20
    345/440

* cited by examiner

Step 1: Construct Pairs Matrix matrix of Pairs for dataset with m-classes (m-clusters)

matrix of Pairs for wine dataset with 3-classes and 13 variables

● FIG. 3 : Single variable, Prior art

○ FIG. 5 : Combined variables, Present invention

MULTIVARIATE DIGITAL DISPLAY DEVICE AND METHOD FOR INCREASING THE SEPARATION BETWEEN CLASSES' DATA POINTS IN HYPERSPACE

GOVERNMENT INTEREST

The embodiments herein may be manufactured, used, and/or licensed by or for the United States Government without the payment of royalties thereon.

BACKGROUND

Technical Field

The embodiments herein generally relate an analysis of a data set of points, and more particularly to visualizing points in hyperspace.

Description of the Related Art

Research studies and experiments in various scientific disciplines require the analysis of data set comprised of points in hyperspace with multiple classes (groups or clusters). The term "hyperspace" is defined herein as the mathematical construct of four or more dimensional spaces (≥4D) in contrast to a two- and three-dimensional space, referred to herein as 2D and 3D, respectively. Such data set consist of points defined by four or more variables as well as multiple classes, also referred to herein as multivariate data, which can be denoted as (x, y, z, . . . , n) where x represents the first variable, y represents the second variable, z represents the third variable, and so forth up to a variable denoted here as n (represent a space with n-dimension or nD). The challenge in analyzing such data set is that humans can typically only visualize 2D and 3D objects or plots with a limited number of classes or clusters as well as a limited number of data points. Generally, humans cannot visualize multivariate data set without some sort of projection, mapping, or illustration tool that reduces the multivariate data to either a 2D or 3D form. Classes in hyperspace become further overlapped or co-mingled when the hyperspace is reduced down to 2D or 3D from a higher dimensional space.

Scientists and mathematicians have developed methods to help visualize an object or collection of points in hyperspace by reducing the data set to a 2D or 3D rendering. Such methods can be referred to as multivariate data analysis (MVA). One of the most popular conventional MVAs, also referred as principal component analysis (PCA), finds a first principal component or factor vector (Line $L_1$) in the hyperspace dispersion of all points. This procedure uses all data points of all classes in the data set, and the line $L_1$ is drawn through all those points in hyperspace. All the points (the entire data set) are projected onto $L_1$ by perpendicular lines that cut or intersect $L_1$. The vector (line $L_1$) is rotated such that the intersections of the projected points onto that principal component vector ($L_1$) create the widest dispersion of their projections onto the principal component vector. $L_1$ is named the first principal component or first factor and commonly donated with PC 1. The next or second factor or principal component ($L_2$) by definition is perpendicular to $L_1$. As with $L_1$, all the dataspace points are projected onto $L_2$ until the orientation (or rotation) of $L_2$ is such that the intersections of the projected points onto $L_2$ create the widest dispersion of projections. Vector $L_2$ (line $L_2$) is named the second principal component or second factor (PC 2). This continues for the third factor (vector or line $L_3$) and higher factors until all factors are obtained for the multivariate data. That is, if the multivariate data represent ten dimensions (or variables; the number of variables n=10), then the process is continued until ten factors are calculated. The conventional MVA techniques use the number of dimensions of a data set=number of experimental variables.

The PCA method described above relies on obtaining and using the inherent or raw distribution of all data points of all classes (clusters) in hyperspace and a depth parameter for visualization of the data set with multiple classes reduced to 2D or 3D. By doing that there is a significant loss of separation between classes in hyperspace when it is reduced down onto 2D or 3D. Also, classes become overlapped and encroach on top of each other when the dataspace is reduced down to 2D or 3D.

Another type of related conventional method involves use of a dendrogram. A dendrogram is a tree diagram that can be used to illustrate the arrangement of hierarchical classes (clusters) in a data set. While providing useful information about the hyperspace data, this method uses the Euclidean distances between points in hyperspace in order to derive the hierarchical clustering of classes of data. The angles formed by the lines connecting points in the same class in hyperspace as well as scatter distribution are not used to guide and orient projections to a lower dimension (1D), so any information or insight to be gained by such data are not present in the resulting dendrogram.

There are many methods for reducing data complexity and for analyzing data with multiple classes or subpopulations using either supervised, semi-supervised, or unsupervised approaches (e.g., PCA). Available methods range from simple statistical evaluations (e.g. Gaussian distributions, minimum covariance estimators) to more complex weighted functions (e.g. support vector data description, $L_p$=radius distance from cluster's center in hyperspace, and orthogonal projections to latent structures), but there is a trade-off between ease-of use and the quality of results (loss of information) they provide. More complex multivariate analysis methods generally provide greater diagnostic/predictive power, but are often too advanced to be implemented or understood by a typical researcher or scientist, even with access to complicated, and often quite expensive, multivariate data analysis software packages.

There is a need in the art for a method of finding a mathematical transformation that produces distinct, observable separation between classes in the data set as well as to allow for future, unknown data to be reliably classified and identified.

SUMMARY

In view of the foregoing, an exemplary embodiment of a multivariate digital separation-display device and method for generating pictures of data set comprised of points with multiple classes in hyperspace is provided. The embodiments herein may include an input device, a computer processor, and an output device. The input device may be a keyboard, a laboratory instrument such as a mass spectrometer, a reader of computer readable medium, or a network interface device. The output device may be a monitor used in conjunction with a either a 2D or 3D printer or both. The computer processor receives data from the input device and performs a series of steps to increase separation between classes or clusters in the original hyperspace and transforms that data output into a new hyperspace with the number of dimensions equal to the number of pairs of classes (NPD) in the original data set. NPD=number of dimensions of pairs-hyperspace=number of pairs of classes. In NPD hyperspace, some of the classes approach 100% separation by the method provided by the embodiments herein. From NPD hyperspace, it is straightforward to image down to 2D or 3D multiple classes or clusters without any loss of information. The resulting image is then produced by a non-transitory medium by at least one of the output devices. The processor steps include the use of maximizing the degree of separation (DS) between each pair of classes in the original hyperspace data set as well as the transformation of all classes' data points to NPD hyperspace where some pairs become fully separated. In NPD hyperspace, each pair of classes or clusters will have their own unique axis at which maximum separation is obtained.

More particularly, the embodiments herein provide a multivariate digital separation and display system and method for generating pictures in a pairs-hyperspace from a hyperspace data set of maximized for fully separated classes of the hyperspace data set, the system comprising: an input device for receiving the hyperspace data set with multiple classes (m-classes); a computer processor for receiving the hyperspace data set from the input device and mathematically maximizing a separation between classes and projecting the classes into a pairs-hyperspace that can be visualized; and an output device for producing a representation of the pairs-hyperspace that can be visualized, wherein the computer processor is configured to performs the steps of: (a) constructing a pairs-matrix from the original hyperspace data set comprised of points of multiple classes in hyperspace; (b) evaluating a percent degree of separation of each pair of classes over all available variables in the hyperspace data set; (c) calculating a maximum degree of separation and corresponding variable in the hyperspace data set; (d) calculating a maximum degree of separation of each pair of classes by combining only contributing variables; (e) transforming the hyperspace data set of n-dimension and m-classes to a pairs-dimension using the calculated maximum degree of separation determined in step (d); (f) transmitting data from steps (b), (c), and (d) to a 2D output device for visual presentation of pairs-hyperspace data; and (g) transmitting data from step (e) to a 3D output device for 3D graphical presentation of data points in 3D space for any of three classes of interest. The input device may comprise any of a keyboard, a laboratory instrument, a reader of computer readable media, and a network device. The output device may comprise any of a 2D printer and a 3D printer. Additionally, the output device may comprise a display monitor. Moreover, n-dimension represents a number of variables. The pairs-dimension may comprise a number of axes and equals a number of pairs equaling $m(m-1)/2$. Furthermore, the visual presentation in step (f) may comprise a graphical presentation list of all pairs of clusters and corresponding degree of separations using a single variable and a combination of contributing variables.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1:
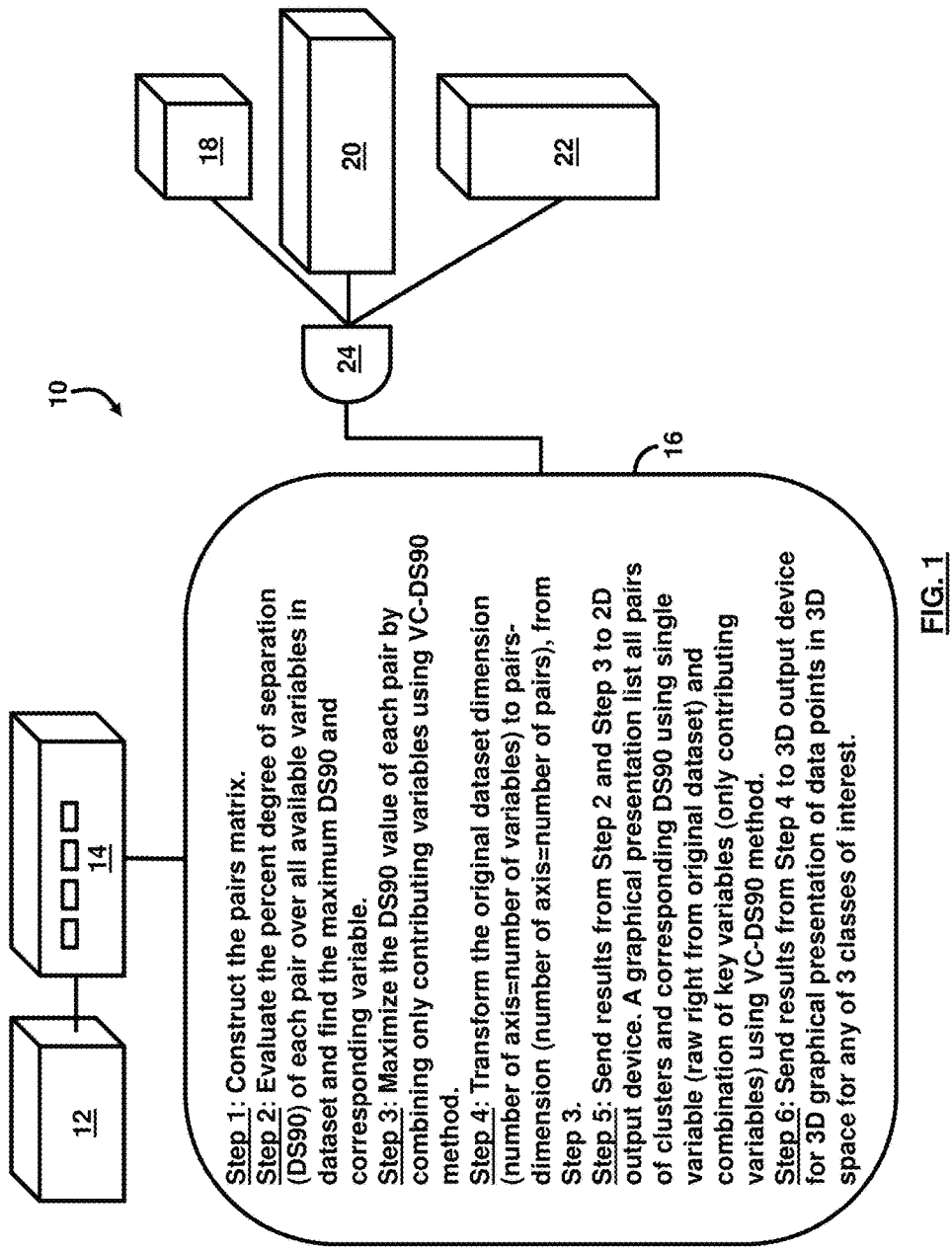
FIG. 1 is a schematic diagram of a system according to the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIGS. 1 through 17, where similar reference characters denote corresponding features consistently throughout the figures, there are shown preferred embodiments. The embodiments herein provide a multivariate digital separation display device and method that utilizes all important variables to fully separate classes (clusters) in hyperspace as well as to image the dataspace down onto a 2D and 3D format. This allows for human understanding or visualization without any loss of any separation information between classes as well as from the scattering and orientations of all classes of data points in hyperspace. The separation device and methodology accepts multiple overlapped classes (clusters) of data and actually further separates them to nearly a full separation. All points of the hyperspace classes (clusters) are individually imaged onto a 2D or 3D format (surface) for human visualization without loss of separation information in hyperspace between classes or clusters.

A method provided by the embodiments herein (a) increases the separation between all classes in the original data set's hyperspace (dimensionality) and (b) transforms the data points into new dimensionality or hyperspace (where the number of dimensions=number of pairs of classes) for ease of visualization and analysis. Optimal separations between all classes in the hyperspace data set are achieved by determining and combining only key contributing variables in the data set for all pairs of classes and to transform the classes into a new dimensionality called pairs-hyperspace. From the pairs-hyperspace, presentations can be made to lower dimensionality by selecting any 1D presentation at a time or 2D presentation at time or 3D presentation at a time from pairs-hyperspace.

A method of the embodiments herein includes implementing a full set of transformation steps 16 as shown in FIG. 1 that have been reduced to practice in five public library data set with different complexities. The five data sets are: (I)—a set of 13 variables or dimensions (=13D) with 3 classes of wine; (II)—a set of 4D iris data with 3 classes; (III)—a set of 7D Escherichia coli (E. coli) protein data with 5 classes; (IV)—a set of 9D breast tissue data with 6 classes; and (V)—a set of 9D breast cancer (Wisconsin2) data with 2 classes. The steps 16 of the method in FIG. 1 create a new hyperspace (NPD space or dimensions) for optimal separations between all classes in the data set, and for subsequent decision-making and/or hypothesis-testing.

In one embodiment, the results of these steps 16 shown in FIG. 1 may be ultimately embodied in a single software implementation that allows one to visualize the transformed original N-dimensionality (variables) of the data set to a simpler number of pairs-dimensionality of 1, 2, 3, or even 4 dimensions. The embodiments herein provide better separation of data and display of data than the conventional solutions.

In the embodiments herein, the steps 16 in FIG. 1 are applied to a variety of public domain data (five data sets) to separate all classes and transform to a new hyperspace. All of the five public domain data set which are available online from the Machine Learning Repository of the University of California Irvine (currently available at http://archive.ics.uci.edu/ml/), and is hereby incorporated by reference. The selected data set have also been recently analyzed using a number of discriminant/cluster analysis techniques, the results of which were published by Tax et al., "Outlier Detection Using Ball Descriptions With Adjustable Metric," SSPR&SPR, 2006, pp. 587-595), the complete disclosure of which, in its entirety, is hereby incorporated by reference. These conventional techniques/methods included standard approaches (i.e., simple Gaussian distributions, the Minimum Covariance Determinant algorithm, the Parzen density estimator, the k-centroid method, and the support vector data description) as well as variations on three new formulations of the so-called $L_P$-distance parameterization.

Methods of the embodiments herein are applied to the Italian wine data set, which is currently available from the Machine Learning Repository of the University of California Irvine (https://archive.ics.uci.edu/ml/dataset/Wine) and is hereby incorporated herein by reference. The wine data set consists of three classes and 13 variables as described in Table 1 below. The data are the results of a chemical analysis of wines grown in the same region in Italy but derived from three different cultivars. It consists of 13 variables (attributes or features or constituents found in wine) and three classes (types of wine). The data set consists of three classes of wines and number of samples analyzed (# cases analyzed in each class). The 13 variables were measured to determine the wine quantities of 13 constituents found in each of the three types of wines.

TABLE 1

| Class ID | Classname | # cases or samples |
|---|---|---|
| 1 | Barolo | 59 |
| 2 | Grignolino | 71 |
| 3 | Barbera | 48 |
| | (Total Number of Instances) | 178 |

| Variable # | Description |
|---|---|
| 1 | Alcohol |
| 2 | Malic acid |
| 3 | Ash |
| 4 | Alkalinity of ash |
| 5 | Magnesium |
| 6 | Total phenols |
| 7 | Flavonoids |
| 8 | Nonflavonoid phenols |
| 9 | Proanthocyanins |
| 10 | Color intensity |
| 11 | Hue |
| 12 | OD280/OD315 of diluted wines |
| 13 | Proline |

Table 2 illustrates the three different classes (groups or clusters) in the wine study showing the maximum number of pairs of classes is three [n(n−1)/2=3×2/2], and the maximum number of VCA (variables combination axes) to explain and separate three classes is equal to the number of pairs (NP) which is three. The original data set has 13 variables. There is one case that might exist where all of the five classes are fully separated in one VCA.

TABLE 2

| Pair | Top Ranked Variable | Initial DS90 (%) @Top Variable Before VCA* | Final DS90 (%) @VCA | Variables combined | VCA ? |
|---|---|---|---|---|---|
| Wine_Class_1&2 | 13 | 87 | 96 | 13, 10, 2, | VCA 1&2 |
| Wine_Class_1&3 | 7, 12 | 100 | 100 | 4, and 12 | VCA 1&3 |
| Wine_Class_2&3 | 10 | 86 | 100 | 10, 12, 7, and 11 | VCA 2&3 |

*VCA = variable combination axis = see FIG. 1.

Methods of the embodiments herein are applied to the iris data set, which is currently available from the Machine Learning Repository of the University of California Irvine (https://archive.ics.uciedu/ml/dataset/Iris) and is hereby incorporated herein by reference. The data set consists of three classes and four variables (Table 3). Table 3 presents the iris data study. The data set contains three classes of 50 experimental results each, where each class refers to a type of iris plant species. One class is linearly separable from the other two; the latter are not linearly separable (Table 4). Table 3 further shows three classes of Iris and the number of samples analyzed (# cases analyzed in each class).

TABLE 3

| Class ID | # cases or Class name | samples |
|---|---|---|
| 1 | Iris setosa | 50 |
| 2 | Iris versicolor | 50 |
| 3 | Iris virginica | 50 |
| | (Total Number of Instances) | 150 |
| Variable # | Description | |
| 1 | sepal length in cm | |
| 2 | sepal width in cm | |
| 3 | petal length in cm | |
| 4 | petal width in cm | |

Table 4 presents a summary of the variable ranking and variable combination on Iris data. There are three different classes or groups or clusters. The maximum number of pairs is three [n(n−1)/2=3×2/2], and the maximum number of VCA (variables combination axes) to explain and separate three classes is equal to the number of pairs in the data set, which is 3. Initially the data set has two of the three pairs with DS90=100%. Out of three pairs there are two pairs with higher than 90% separation, DS90>90%, and one pair with 81% separation. After VCA, the second part of the method provided by the embodiments herein produces two of three pairs with DS90=100%. All of the three pairs attain higher than 90% separation, DS90>90%.

TABLE 4

| Pair | Top Ranked Variables | Initial DS90 (%) @Top Variable | Final DS90 (%) @VCA | Variables combined | VCA ? |
|---|---|---|---|---|---|
| Iris_Class_1&2 | 3, 4 | 100 | 100 | 3 or 4 | VCA 1&2 |
| Iris_Class_1&3 | 3, 4 | 100 | 100 | 3 or 4 | VCA 1&3 |
| Iris_Class_2&3 | 4 | 80.89 | 93.86 | 4, 3, 1 | VCA 2&3 |

Methods of the embodiments herein are applied to the Escherichia coli (E. coli) data set, which is currently available from the Machine Learning Repository of the University of California Irvine (https://archive.ics.uci.edu/ml/dataset/Ecoli) and is hereby incorporated herein by reference. As shown in Table 5, the data set consists of five classes and seven variables. Accordingly, Table 5 presents the E. coli data study whereby the data are the results of predicting protein localization sites in Gram-negative bacteria. It consists of seven variables (attributes or features or constituents found in E. coli) and five classes (types of localization site). It shows five classes of proteins by localization site and number of samples analyzed (# cases analyzed in each class). The classes represent proteins in different cellular sites in E. coli.

TABLE 5

| Class ID | Class name | # cases or samples |
|---|---|---|
| 1 | cytoplasm | 143 |
| 2 | inner membrane without signal sequence | 77 |
| 3 | periplasm | 52 |
| 4 | inner membrane, uncleavable signal sequence | 35 |
| 5 | outer membrane | 20 |
| | (Number of Instances) | 327 |
| Variable # | Description Proteins from different cellular sites. The proteins are investigated by their amino acid sequence. | |
| 1 | McGeoch's method for signal sequence recognition | |
| 2 | von Heijne's method for signal sequence recognition | |
| 3 | von Heijne's Signal Peptidase II consensus sequence score (Binary attribute) | |
| 4 | Presence of charge on N-terminus of predicted lipoproteins. (Binary attribute). | |
| 5 | Score of discriminant analysis of the amino acid content of outer membrane and periplasmic proteins. | |
| 6 | Score of the ALOM membrane spanning region prediction program. | |
| 7 | score of ALOM program after excluding putative cleavable signal regions from the sequence | |

Table 6 presents summary of variable ranking and variable combo on the E. coli data set. There are five different classes or groups or clusters. The maximum number of pairs is 10 [n(n−1)/2=5×4/2]. The maximum number of VCA to explain and separate five classes is equal to the number of pairs, which is 10. The data set has only seven variables. There are two cases that might exist where three of the five classes are fully separated. Initially, the data set has zero pairs out of ten pairs that are fully separated (DS90 of 100%). This is observed in the third column in Table 6. Only five out of ten pairs have higher than 90% separation (DS90>90%). After VCA in the fourth column in Table 6, four pairs out of ten pairs have attained a total and full separation (DS90=100%). Nine out of ten pairs have attained higher than 90% separation (DS90>90%). There is a significant increase in the separation between the five *E. coli* classes with the embodiments herein compared conventional solutions.

TABLE 6

| Pair | Top Ranked Variable | Initial DS90 (%) @Top Variable | Final DS90 (%) @VCA | Variables combined | VCA |
|---|---|---|---|---|---|
| Ecoli_Class_1&2 | 6 | 96.8 | 99. | 6, 3, 1, 2 | VCA 1&2 |
| Ecoli_Class_1&3 | 2 | 82.7 | 93.7 | 2, 1, 5, 7, 6 | VCA 1&3 |
| Ecoli_Class_1&4 | 6 | 97.4 | 100 | 6, 7 | VCA 1&4 |
| Ecoli_Class_1&5 | 5 | 88.2 | 100 | 5, 1, 2 | VCA 1&5 |
| Ecoli_Class_2&3 | 6 | 86.6 | 93.75 | 6, 2, 7 | VCA 2&3 |
| Ecoli_Class_2&4 | 1 | 50.4 | 62.9 | 1, 2, 5, 3, 7 | VCA 2&4 |
| Ecoli_Class_2&5 | 6 | 95.4 | 100 | 6, 5, 7 | VCA 2&5 |
| Ecoli_Class_3&4 | 7 | 95.4 | 96.7 | 7, 5 | VCA 3&4 |
| Ecoli_Class_3&5 | 5 | 86.5 | 92.1 | 5, 7, 6 | VCA 3&5 |
| Ecoli_Class_4&5 | 7 | 95.0 | 100 | 7, 2, 6 | VCA 4&5 |

Methods of the embodiments herein are applied to the breast tissue data set, from the Machine Learning Repository of the University of California Irvine (https://archive.ics.uci.edu/ml/dataset/Breast+Tissue), which is hereby incorporated by reference. Table 7 presents the breast cancer study, wherein the data set consists of six classes (excised tissues) and nine variables (features). Table 7 shows six classes of freshly excised tissues that studied using electrical impedance measurements and number of samples analyzed (# cases analyzed in each class).

TABLE 7

| Class ID | Class name | # cases or samples |
|---|---|---|
| 1 | Carcinoma, Deadly (cancer) | 21 |
| 2 | Fibro-adenoma, Non-Deadly (Tumor) | 15 |
| 3 | Mastopathy, Non-Deadly (cyst) | 18 |
| 4 | Glandular, Normal | 16 |
| 5 | Connective, Normal | 14 |
| 6 | Adipose, Normal | 22 |
|  | (Total Number of Instances) | 106 |

| Variable # | Description |
|---|---|
| 1 | Impedance (ohm) at zero frequency |
| 2 | phase angle at 500 KHz |
| 3 | high-frequency slope of phase angle |
| 4 | impedance distance between spectral ends |
| 5 | area under spectrum |
| 6 | area normalized by DA |
| 7 | maximum of the spectrum |
| 8 | distance between 10 and real part of the maximum frequency point |
| 9 | length of the spectral curve |

Table 8 presents a summary of variable ranking and variable combinations on a breast tissue data set. There are six different classes or groups or clusters. The maximum number of pairs is 15 [n(n−1)/2=6×5/2]. The maximum number of variables to explain and separate six classes is equal to the number of pairs which is fifteen. Initially, the data set has six out of fifteen pairs that have attained full separation (DS90 of 100%). Ten out of fifteen pairs have attained higher than 90% separation (DS90>90%). After variable ranking and variable combination axes (VCA), nine out of fifteen pairs have or attained a total and full separation (DS90=100%). Eleven out of fifteen pairs have attained higher than 90% separation (DS90>90%). Pair 1&2 shows no increase in its overall DS90 over all original variables except variable seven. Only variable seven allows discrimination between classes 1 and three. All of the other variables have no effect on the separation of these classes.

TABLE 8

| Pair | Top Ranked Variable | Initial DS90 @Top Variable | Final DS90 (%) @VCA | Variables combined | VCA |
|---|---|---|---|---|---|
| BreastTissue_Class_1&2 | 7 | 92.6 | 92.6 | 7 | VCA 1&2 |
| BreastTissue_Class_1&3 | 5 | 66.51 | 77.59 | 5, 6, 9, 7, 3 | VCA 1&3 |
| BreastTissue_Class_1&4 | 7 | 94.10 | 100 | 7,4 | VCA 1&4 |
| BreastTissue_Class_1&5 | 1 | 100 | 100 | 1 | VCA 1&5 |
| BreastTissue_Class_1&6 | 1 | 94.10 | 100 | 1 | VCA 1&6 |
| BreastTissue_Class_2&3 | 7 | 31.80 | 46.85 | 7, 3, 2 | VCA 2&3 |
| BreastTissue_Class_2&4 | 7 | 41.2 | 78.9 | 7, 8, 4, 6, 3 | VCA 2&4 |
| BreastTissue_Class_2&5 | 1, 4, 8, 9 | 100 | 100 | 1 | VCA 2&5 |
| BreastTissue_Class_2&6 | 1, 9 | 100 | 100 | 1 |  |
| BreastTissue_Class_3&4 | 8 | 458 | 60.5 | 8, 3, 7, 2 | VCA 3&4 |
| BreastTissue_Class_3&5 | 1 | 91.6 | 100 | 1,4 | VCA 3&5 |
| BreastTissue_Class_3&6 | 1,9 | 100 | 100 | 1 | VCA 3&6 |
| BreastTissue_Class_4&5 | 1 | 100 | 100 | 1 | VCA 4&5 |
| BreastTissue_Class_4&6 | 1,9 | 100 | 100 | 1 | VCA 4&6 |
| BreastTissue_Class_5&6 | 9 | 86.5 | 92.8 | 9, 1, 8 | VCA 5&6 |

Methods of the embodiments herein are applied to the Breast-Cancer-Wisconsin2 data set, which is currently available from the Machine Learning Repository of the University of California Irvine (https://archive.ics.uciedu/ml/dataset/Breast+Cancer+Wisconsin+(Original), which is hereby incorporated by reference. As shown in Table 9, the data set consists of two classes and nine variables. Table 9 presents Breast-Cancer-Wisconsin2 data set consisting of two classes or diagnosis clusters: B=benign, M=malignant cancer breast tissue. Variables or features are computed from a digitized image of a fine needle aspirate (FNA) of a breast mass. They describe characteristics of the cell nuclei present in the image. The original data set consists of 699 rows (separate experimental breast tissue sections) with sixteen rows having missing values. There are sixteen instances (rows) contain a single missing (i.e., unavailable) attribute value, denoted by "?". The sixteen rows having missing values were removed from original data set and became 683 rows (699−16) in the data set.

TABLE 9

| Class ID | Class name | # cases or samples |
|---|---|---|
| 1 | Benign (healthy) | 444 |
| 2 | Malignant (cancer) | 239 |
| | (Total Number of Instances) | 683 |

| Variable # | Description |
|---|---|
| 1 | Clump Thickness |
| 2 | Uniformity of Cell Size |
| 3 | Uniformity of Cell Shape |
| 4 | Marginal Adhesion |
| 5 | Single Epithelial Cell Size |
| 6 | Bare Nuclei |
| 7 | Bland Chromatin |
| 8 | Normal Nucleoli |
| 9 | Mitoses |

Table 10 presents a summary of the variable ranking and variable combo on Breast-Cancer-Wisconsin2 data set. There are two different classes or groups or clusters. The maximum number of pairs is 1 [n(n−1)/2=2×1/2]. The maximum number of variables to explain and separate the two groups is equal to the number of pairs which is 1. The data set has nine variables. Initially, the data set produce 79.2% separation between the two classes (one pair) and the top variable is 1. After variable ranking and variable combo (VCA), the two classes (one pair) attain a 96% separation (DS90=96%) between them. That is an increase by 17% from the original data set using four key variables out of nine variables.

TABLE 10

| Pair | Top Ranked Variable | Initial DS90 (%) @Top Variable | Final DS90 (%) @VCA | Variables combined | VCA |
|---|---|---|---|---|---|
| Breast cancer Class_1&2 | 1 | 79.2 | 96 | 9, 5, 8, 2 | VCA 1&2 |

FIG. 1 is a schematic diagram illustrating an exemplary embodiment of a multivariate (hyperspace) digital separation and display system 10 and method for generating pictures of data set comprised of points of different classes in hyperspace. The embodiments herein may be embodied as illustrated here as an input device 12, a computer processor 14 which processes machine readable instructions comprising steps 16, and one or more output devices 18, 20, 22. Computer processor 14 and its process steps 16 may communicate data to an output controller 24 for data manipulating and formatting as well as output device 18, 20, 22 control.

Input device 12 in the embodiments herein functions similarly to an import device or data acquisition device. That is, input device 12 provides the raw data set to be imaged to by the display system 10. Input device 12 may comprise a keyboard, a laboratory instrument such as a mass spectrometer, a reader of computer readable medium, or a network interface device.

Output devices 18, 20, 22 in the embodiments herein are used to create a picture or image of different classes in the pairs-hyperspace or object in either a 2D format or 3D format. The embodiments herein may utilize a plurality of output devices 18, 20, 22 to provide the user with a choice of viewing options in visualizing and analyzing the hyperspace data set. For example, output devices illustrated in FIG. 1 may include a monitor 18, a 2D printer 20, and a 3D printer 22. The 3D printer 22 is also referred to as an additive manufacturing device. Such output devices can produce a 3D object of solid, tangible material. Thus, both the 2D printer 20 and the 3D printer 22 produce an image of the NPD data set in a non-transitory medium. For the 2D printer 20, the non-transitory medium is typically paper or another flat medium such as vellum or polyester film. For the 3D printer 22, the non-transitory medium is typically a plastic, metal, ceramic, or composite material used to form a 3D object.

The computer processor 14 in the embodiments herein receives data from input device 12. Having received this data, computer processor 14 then performs a series of steps 16 as further described below to create a 2D and/or 3D image of the pairs-hyperspace of different classes in data set. The resulting image is then produced in a non-transitory medium by one or more of the output devices 20, 22. The output device embodied as a monitor 18 provides visualization capability in a transitory medium. That is, the images produced by output device 18 are displayed on a monitor screen. This monitor imaging capability is used to view and manipulate the 2D and 3D images of the pairs-hyperspace for analyzing the data set with different classes and selecting the perspective for the 2D and 3D print in a non-transitory medium using output devices 20 and/or 22.

Having provided an overview of the embodiments herein, attention is now turned to a detailed description of the processor steps 16 provided herein starting with a background of multivariate analysis and visualization. A 2D display can be defined by the coordinates along two axes at right angles to each other and a 3D display can be defined by the coordinates along three axes, each at right angles to the other two axes. Similarly, a 4D hyperspace can be defined mathematically by four axes, each at right angles to the other three axes. This 4D hyperspace cannot be displayed or visualized by a human, but it can be created in mathematical space.

In the embodiments herein, after receiving a hyperspace data set with multiple classes from input device 12, the first step in processor steps 16 serves to construct the pairs-matrix, calculate the optimum separation between each pair of classes and transform the data points of all classes into the pairs-hyperspace. This is performed by construction of pairs-matrix. The pairs-matrix that is constructed has m(m−1)/2 pairs from data set with m-classes. By way of example, a hyperspace data set with different classes could include the data measured by a mass spectrometer.

The challenge then is in providing a meaningful and useful 2D and/or 3D representation of this data set that preserves as much of the multivariate information as possible and minimizes overlapping of points of different classes going from hyperspace down to 2D or 3D space as displayed.

The processing steps 16 of the embodiments herein utilize a pairs-matrix with m(m−1)/2 pairs to represent all classes data points in hyperspace in pairs as received from input device 12. In this notation, the pair 1&2 correspond to the construction of class 1 and class 2 pair or class 1&2 pair.

The degree of separation (DS) is defined herein as the average of the sum of the areas from the probability density functions (PDFs) of A and B that contain a ≥percentage of A and/or B. Thus, DS90 is the average of the sum of the PDF areas of A and B that contain ≥90% of A and/or B. A receiver operating characteristic (ROC) is a graphical plot that illustrates the performance of a binary classifier system as its discrimination threshold is varied. The length of the ROC is denoted as LROC herein.

Figure 2:
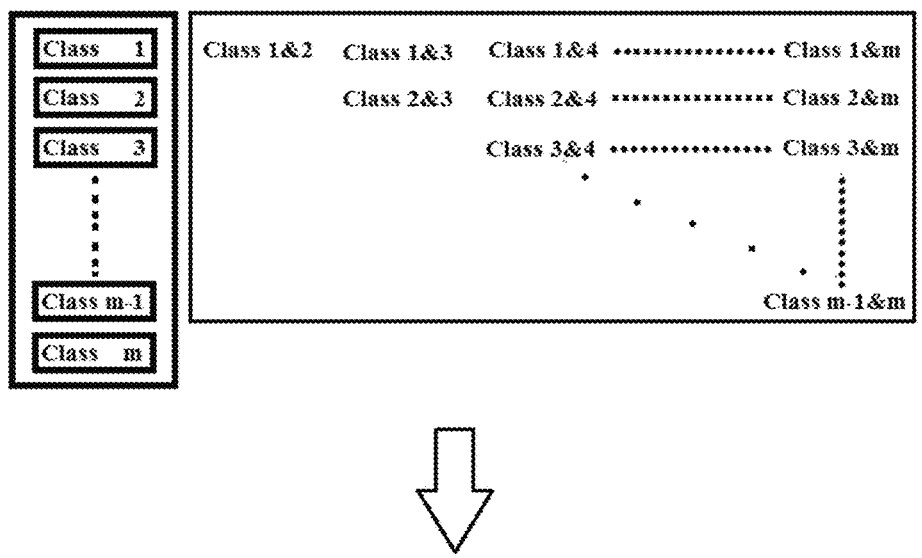
FIG. 2 is an illustration showing how the pairs' matrix is constructed, in accordance with step 1 in FIG. 1, on a data set with m-classes as well as on a wine data set with 3 classes.
Figure 2:
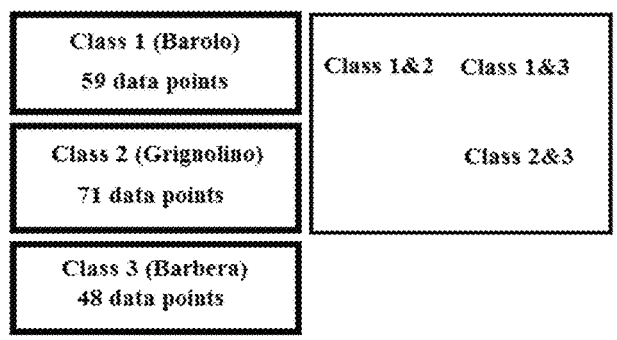
Figure 3:
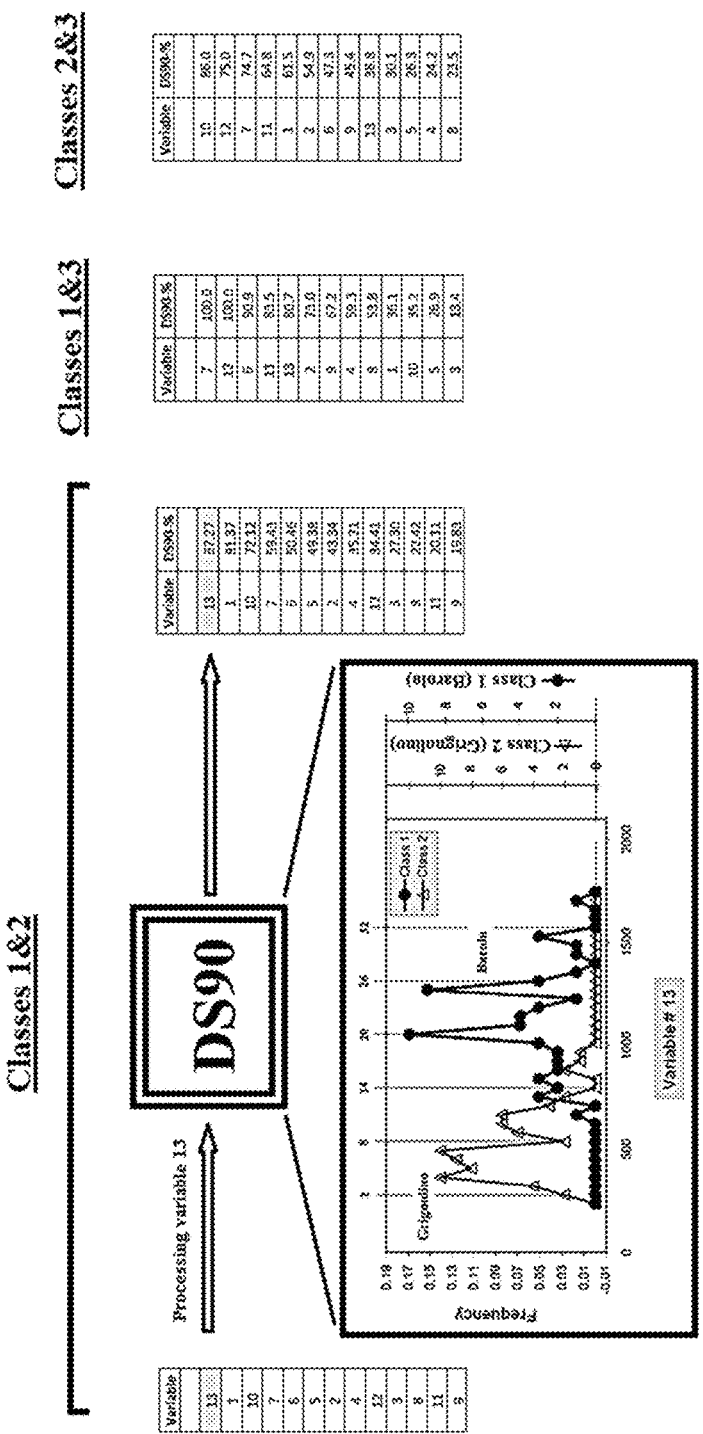
FIG. 3 is an illustration showing how the frequency plot is generated using wine data points of class 1 and class 2 with respect to their variable 13 responses, with three tables illustrating the results of applying the DS90-LROC over all three wine pairs and over all 13 variables in the wine data set, in accordance with step 2 in FIG. 1.

Turning to FIG. 2, with reference to FIG. 1, is an illustration showing how the pairs' matrix is constructed (step 1 in FIG. 1) on data set with m-classes as well as on wine data set with three classes. FIG. 3, with reference to FIG. 1, is an illustration showing how data points of wine pair (class 1&2) over variable 13 are processed to obtain the percent degree of separation (DS90-%) using the DS90-LROC approach as provided by Maswadeh and Snyder, "Variable ranking based on the estimated degree of separation for two distributions of data by the length of the Receiver Operating Characteristic curve," Analytica Chimica Acta (2015), pp. 39-48, the disclosure of which is incorporated herein by reference. The three tables in the reference are illustrations that show how the results of applying the DS90-LROC for all three wine pairs using thirteen variables in the wine data set (Step 2 in FIG. 1). Variables are sorted according to max-to-min DS90 values for the three pairs (three tables on right-hand side). Each pair of wines shows the inherent (original) maximum degree of separation available for the pair and corresponding variable. For example, for the first pair (Class 1&2), variable 13 gave the maximum degree of separation of 87.27 between class 1 and class 2. For the second pair (Class 1&3), variable 7 or 10 gave a 100% degree of separation (fully separated) between class 1 and class 3. For the third pair (Class 2&3), variable 10 gave the maximum degree of separation of 86% between class 2 and class 3.

The point plot in FIG. 3 is a frequency plot of the response data of wine classes 1 and 2 with respect to experimental variable 13. The point plot is converted into a standard cumulative density function (CDF). A standard receiver operating characteristic (ROC) curve is then constructed. However, to analyze the ROC curve, the LROC method is used. The LROC value is converted into the DS90 value using equation y=187x. This equation is data independent and any data set can be applied to that equation. Every DS90 entry in the three tables on the right-hand side of FIG. 3 is produced from the cited procedures.

Variables are sorted according to the maximum-to-minimum DS90 values for the three pairs (three tables). Each pair of wines shows the inherent (original) maximum degree of separation available for the pair and corresponding variable. For example, for the first pair (Barolo class 1 & Grignolino class 2), variable 13 give the maximum degree of separation of 87.3% with no enhanced separation. For the second pair (class 1 & Barbera class 3), variable 7 or 10 yield a 100% degree of separation (fully separated) between class 1 and class 3. For the third pair (classes 2&3), variable 10 gave the maximum degree of separation of 86% with no enhanced algorithm separation.

Figure 4:
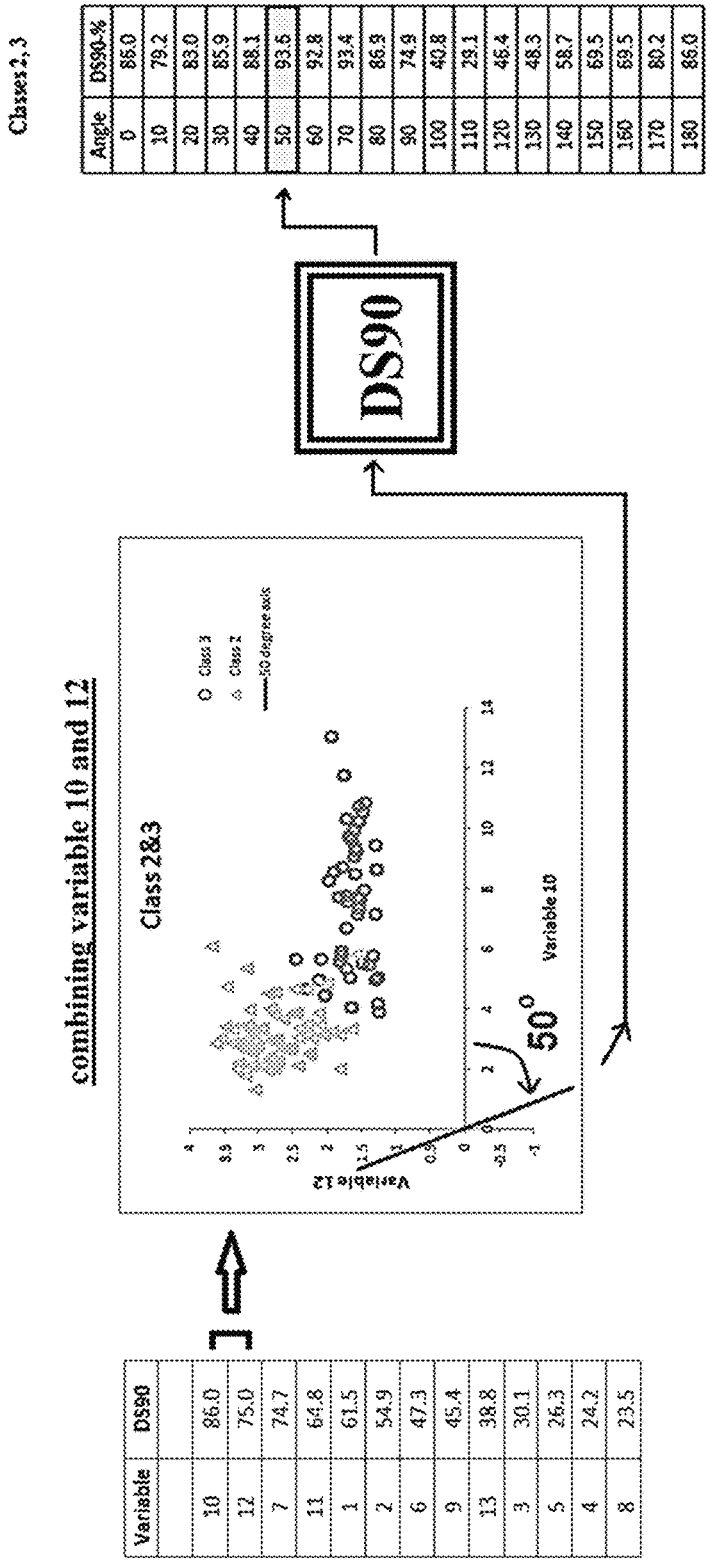
FIG. 4 is an illustration showing how data points for the wine pair (class 2 and class 3) are processed to increase the original degree of separation (from FIG. 3) by combining only the key contributing variables (no user input or intervention, in accordance with step 3 in FIG. 1)

FIG. 4, with reference to FIG. 3, is an illustration showing how data points for the wine pair (class 2 and class 3) are processed to increase the original degree of separation (from FIG. 3) by combining only the key contributing variables (no user input or intervention, step 3 in FIG. 1). Variable combination illustration starting with the first two (top) variables, variables 10 and 12 reveal an increase in separation from 86% to 93.6% with an axis of rotation of 50 degree clockwise rotation. Other rotational axes (from 0 to 180 by 10 degree increment) and corresponding DS90 are shown in the insert table in FIG. 4 (far right).

The ability for separation beyond (right tables in FIG. 4) what the raw variables in the data set provide (left table in FIG. 4 which is the same as the far right table in FIG. 3), is unique to the embodiments herein. The conventional statistical analysis procedures and methods fail to provide this ability to attempt and succeed an enhanced separation between classes of data in a data set (for example, refer to the DS90 increase in the right-hand table in FIG. 4 from the left-hand table, from 86% to 93.6%, respectively).

The variable combination procedure starts with the first two (top) variables. The top variables=variables that provide the greatest degree of separation between two classes of data. Variables 10 and 12 are the top two variables for separation of wine classes 2&3 in FIG. 4 (see leftmost table in FIG. 4). The left table in FIG. 3 is detailed in Maswadeh and Snyder, "Variable ranking based on the estimated degree of separation for two distributions of data by the length of the Receiver Operating Characteristic curve," Analytica Chimica Acta (2015), pp. 39-48. Each variable is analyzed separately with respect to the wine classes 2&3. The strength of the DS90 can be found in the table on the right-hand side of FIG. 4. The data points are plotted on the 2D graph by their experimental responses. Variable 10 (x-axis) and variable 12 (y-axis) are used because they are the top two variables. The maximum DS90=86% by variable 10. However, combining the top two variables in an x-y plot, the following is observed: Lines are drawn every 10 degrees from the origin (0, 0). All lines radiate from the origin.

After all points bisect every line, each line or axis (0, 10, 20, etc.) is then converted into a frequency plot. The 50 degree axis orientation is shown. This is converted into a ROC curve, and the LROC directly provides the DS90 percent separation value. This value is calculated for every axis orientation and all DS90 values are tabulated (right-hand table in FIG. 4). It is observed that the 50 degree orientation provides the greatest DS90 for class 2 and 3 wine data. The 50, 60, and 70 degree orientations are very close in DS90 value. However, the 50 degree rotation provides the highest DS90=93.6%. Thus, two classes of data and two variables are used at a time for a systematic separation of all classes of data and all variables.

It is observed in the right-hand table that the 50 degree line allows for the maximum dispersion and separation of all the points, because it shows an even higher degree of separation (93.6%) than the original 75% by variable 12 or 86% by variable 10. The method can enhance separation from the original analysis when using one variable at a time (the DS90 box in FIG. 4). Therefore, the method uses two classes of data and two variables at a time for maximum separation calculations of classes of data. An optimum axis of 50 degrees clockwise rotation maximized the DS90 value from 86% to 93.6%.

Figure 5:
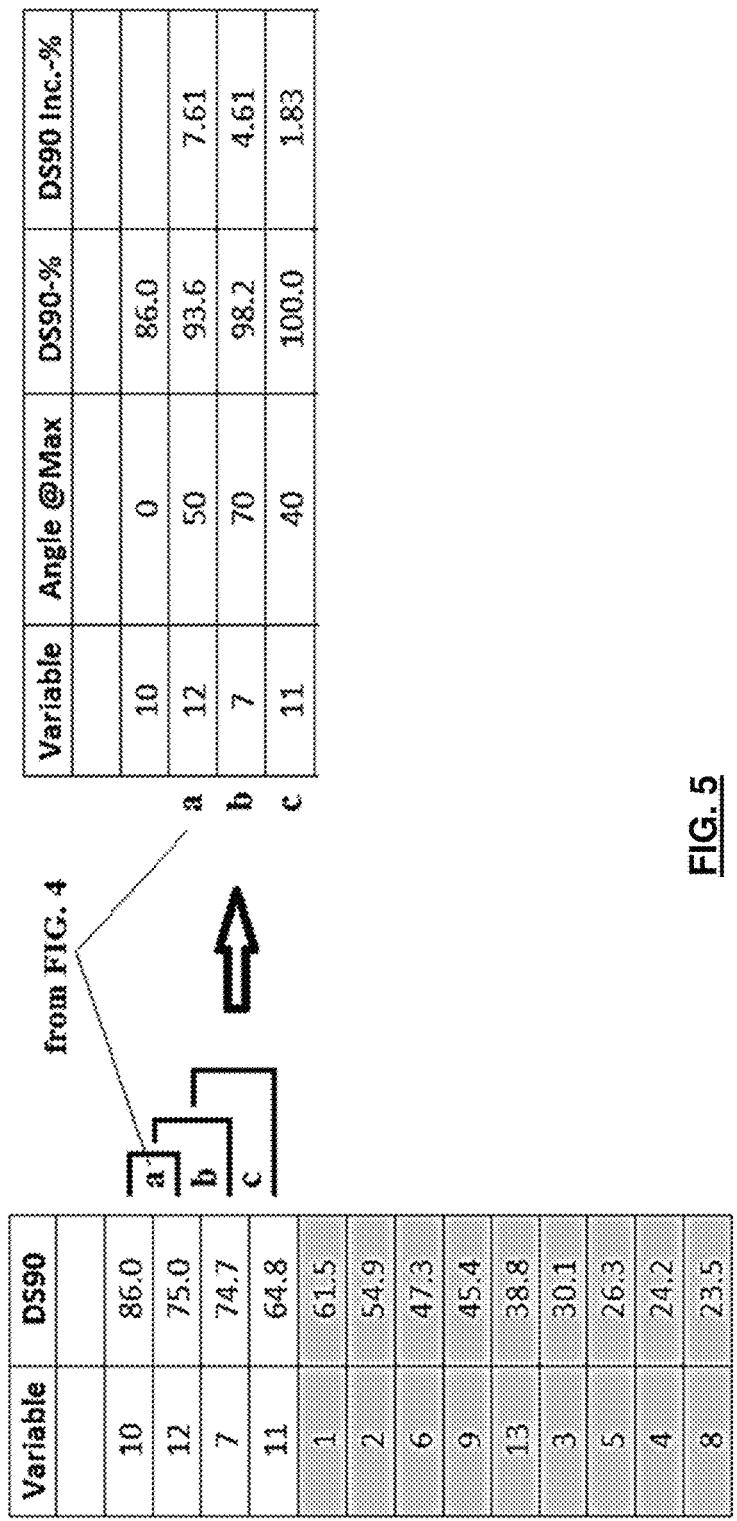
FIG. 5 is a table showing how the DS90 of the wine pair (classes 2 and 3) increases as the key variables (variables 10-12 to 7 and to 11) are combined using the invented method described in FIG. 4 to reach full separation between the two classes (groups in space)

This is the start of the wine analysis. Even further separation of classes 2 and three is possible. The 50 degree orientation axis is labeled variable 10-12. This becomes the new x-axis. The y-axis is variable seven (next variable in line). Thus, a plot of Var 10-12 vs. Var 7 is performed. The entire procedure in FIG. 4 is repeated. All points of classes 2 and three are plotted from their responses as (x, y) pairs from the above mentioned x and y axes. All the points are then projected on the 0-180 degree axes as drawn from the origin. FIG. 5 shows these procedures in tabular format. Note that 'a' refers to the FIG. 4 information and 'b' is outlined in the following. The point plot produces a maximum separation of the data points from the 70 degree line. This point plot is then processed into: a frequency plot, a CDF plot, a ROC curve plot, and LROC is calculated, and this is converted into a DS90 value. This results in a DS90 of 98.2% separation using the top three ranked variables (FIG. 5). This new 70 degree axis is labeled Var 10-12-7 and is the new x-axis. The y-axis is the fourth ranked variable 11 (table on the left-hand side of FIGS. 4 and 5). The entire process is repeated and the DS90 value is 100% separation of wine classes 2 and 3. Therefore, the nine other variables are not necessary for further analysis. The process starts with what the raw data presents for separation purposes and then enhances the inherent data structure.

FIG. 5 is an illustration in table format showing how the degree of separation of wine pair (class 2&3) increases as the key variables are combined using the method provided by the embodiments herein and described in FIG. 4 to reach full separation between the two classes (groups in space). Only the top four variables out of 13 variables were enough to produce 100% separation between the two classes' data points. The axis generated from variable 10 and 12 combination (process 'a' in FIG. 5) is processed with variable 7 (process 'b' in FIG. 5) in similar fashion as in FIG. 4 between variable 10 and 12, and so on (process 'c' in FIG. 5). The combination of top four key variables (19, 12, 7 and 11), using step 3, generated a unique axis for the pair of classes 2 and 3 and with VCA 2&3 symbol. By having a unique axis for each pair in the data set, the embodiments herein achieve: (1) data points are transformed from original-hyperspace to NPD hyperspace: all 13 variables are not necessary because only four variables are necessary for 100% classes separation; (2) data points of different classes are maximally separated and some are fully separated; (3) pairs-hyperspace (NPD) offer straightforward mapping of data points down to lower dimension (2D or 3D) because each axis has only two classes at a time; (4) any unknown data point(s) can be transformed from original-hyperspace to NPD space (pairs-hyperspace). In the pairs-hyperspace, the unknown data point identity will be easily identified.

Classes 1 and 3 are fully separated to the 100% level with either one of two variables 7 or 12. No separation enhancement is necessary or required, because the original data set provided a 100% separation (see middle table on the right-hand side of FIG. 3).

Figure 6:
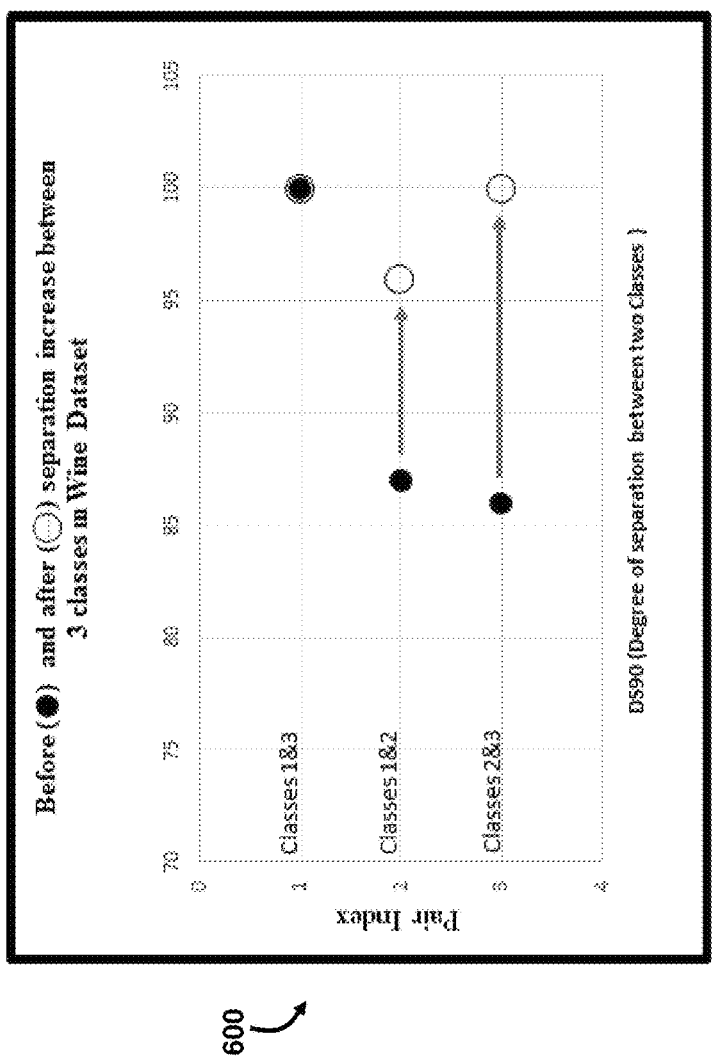
FIG. 6 is a 2D plot of the wine data set DS90 values before (FIG. 3) and after (FIG. 5) the enhanced separation increase between the three classes using the DS90-LROC and the combination of key variables approach (FIG. 4)

FIG. 6 is a 2D plot 600 of wine data set before (FIG. 3) and after (FIG. 5) using the embodiments herein (FIG. 1). Only four of the original 13 variables are sufficient to give 100% separation between class 1&3 pair and class 2&3 pair. In the case of class 1&2 pair, the original 13 variables were not sufficient to give 100% separation but instead close to 96%. This becomes a tool for researchers to look for new variables beyond the 13 original variables that lead to 100% separation between class 1&2 pair.

Figure 7:
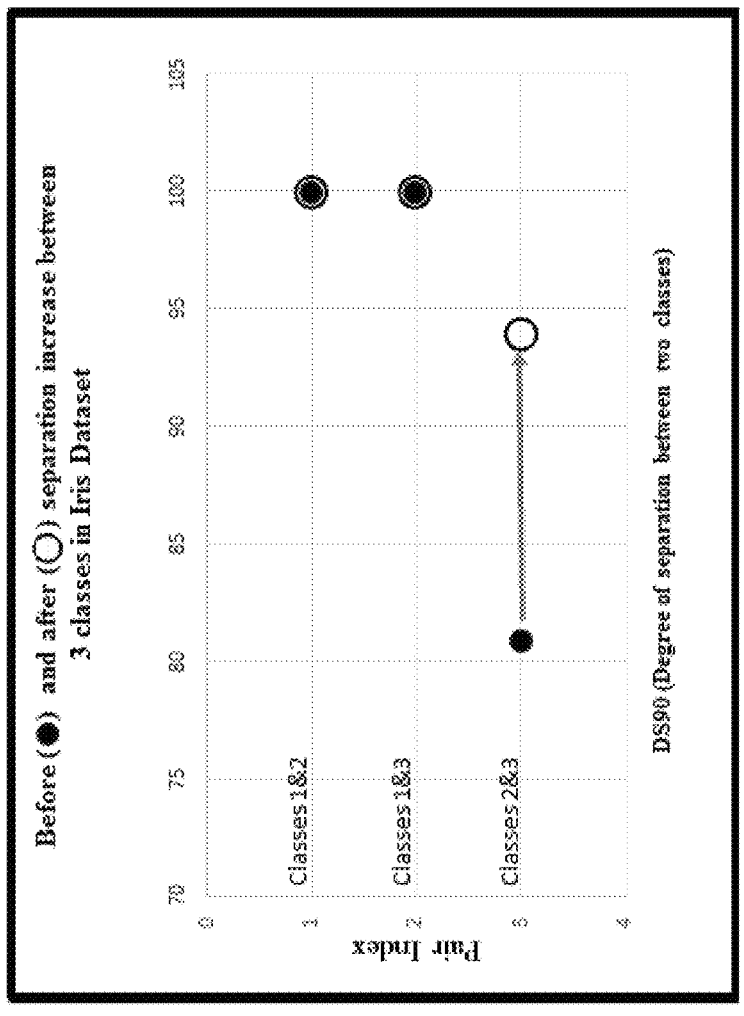
FIG. 7 is a 2D plot of the iris flower data set before and after the enhanced separation increase, similar to the wine data in FIGS. 3-6, between the three classes using steps 1-3 in FIG. 1.

FIG. 7 is a 2D plot 700 of the iris flower data set (three species of iris flower and four different variables) before and after using the embodiments herein (FIG. 1) and separation increase between the three classes (three clusters). The variables are sepal width and length and petal width and length. The original four variables are sufficient to give 100% separation between class 1&2 pairs and class 1&3 pairs. In the case of class 2&3 pairs, the original four variables are not sufficient to give 100% separation but instead close to 94%. This is a tool for researchers to look for new variables beyond the four original variables that lead to 100% separation between class 2&3 pair.

Figure 8:
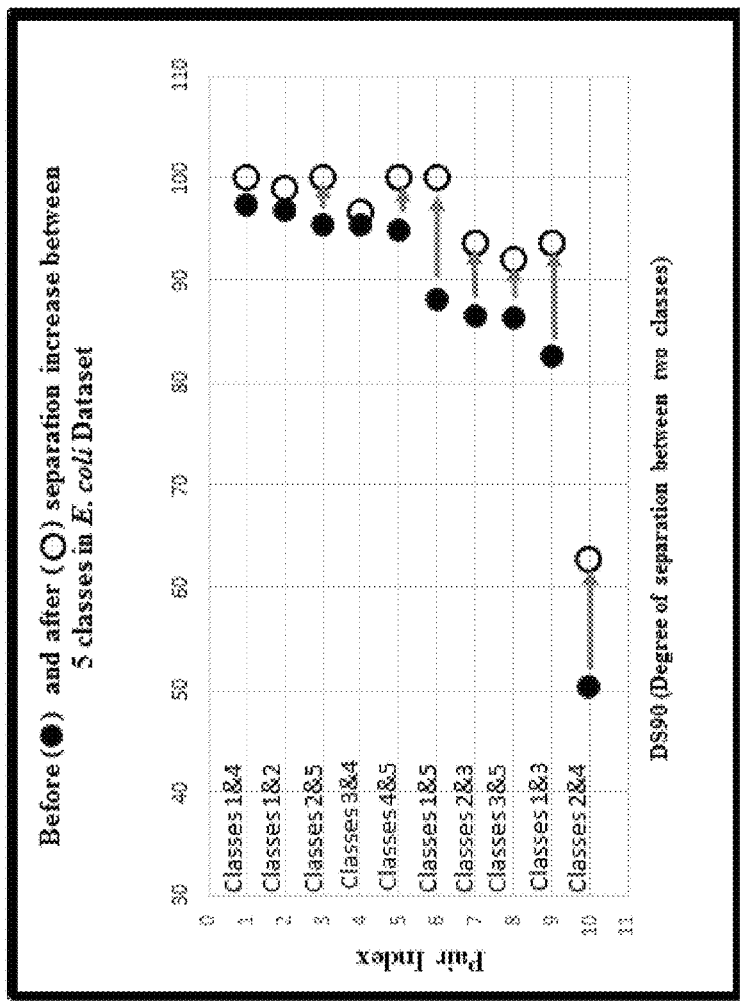
FIG. 8 is a 2D plot of *E. coli* data before and after the enhanced separation increase between five classes of *E. coli* species using (steps 1-3 in FIG. 1) the DS90-LROC and a combination of seven molecular biology variables.

FIG. 8 is a 2D plot 800 of the *E. coli* data set before and after using the embodiments herein (FIG. 1) and separation increase between the five classes (five clusters). The original seven variables are sufficient to give 100% separation (after VCA analysis) for four pairs; between class 1&4 pairs, class 1&5 pairs, class 2&5 pairs and class 4&5 pairs. The original seven variables are sufficient to give 90%<DS90<100% separation between five pairs: class 1&2 pairs, class 1&3 pairs, class 2&3 pairs, class 3&4 pairs, and class 3&5 pairs. In the case of class 2&4 pairs, the original seven variables fail to separate the two classes. It is possible that the two classes are from the same or similar population that cannot be separated. Class two is for the "inner membrane without signal sequence" while class 4 is for the "inner membrane, uncleavable signal sequence." Both are of the inner membrane and differ only in the few amino acids found in the leader (signal) sequence. The signal sequence of a protein is the initial string of amino acids that is cleaved prior to the final protein biomanufacture in the cell.

Figure 9:
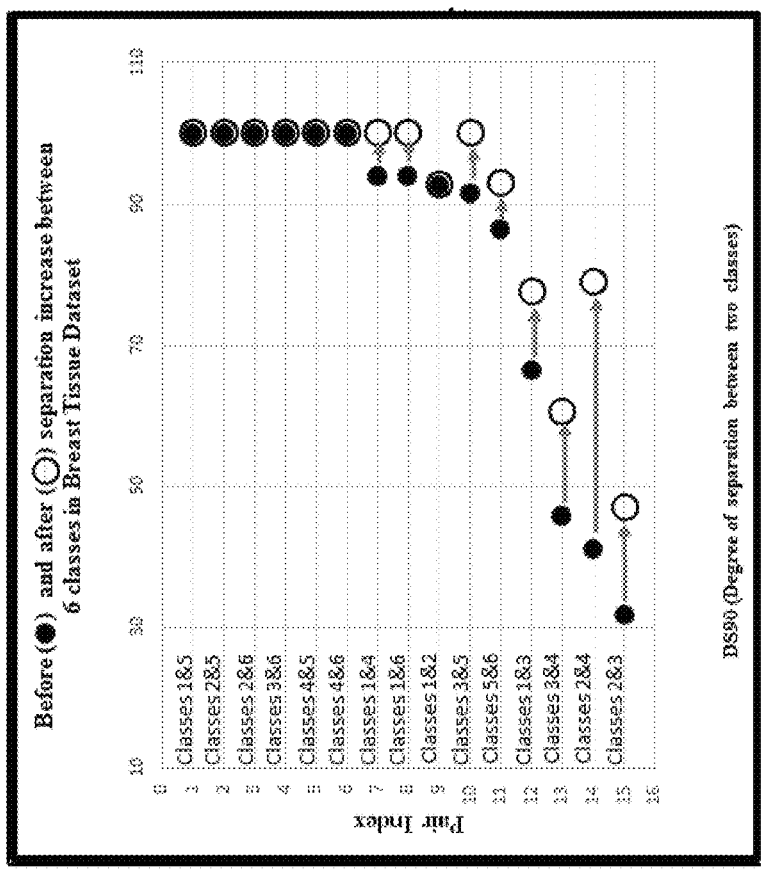
FIG. 9 is a 2D plot of a breast tissue data set before (•) and after (○) the inventive separation increase between the six classes (15 pairs) using (steps 1-3 in FIG. 1) and includes the DS90-LROC and variable combination of key variables approach.

FIG. 9 is a 2D plot 900 of the breast tissue data set before and after using the embodiments herein (FIG. 1). There are notable separation increases between the six classes (six groups). The original nine variables are sufficient to give 100% separation for nine pairs: between classes 1&4, 1&5, 1&6, 2&5, 2&6, 3&5, 3&6, 4&5 and 4&6 pairs. The original nine variables are sufficient to give 90%-99% separation between two pairs: class 1&2 pairs and class 5&6 pairs. Pairs of class 2&4 and class 1&3 made significant improvement in separation from 41% to 79% and 67% to 78%, respectively. In the case of the class 2&3 pairs and class 3&4 pairs, the original nine variables fail to separate the two classes. It is possible that the two classes are from the same or similar, closely related in tissue, populations that cannot be separated. Class two is for the "Fibro-adenoma" while class 3 is for the "Mastopathy" and both are in the presence of benign cysts, noncancerous lumpiness. Class 4 is for the "Glandular" while class 3 is for the "Mastopathy" and both are of benign cysts. Normal, healthy glandular tissue (class 4) may transform into the Mastopathy (class 3) cyst stage. Stages of benign cysts are Glandular (class 4)—Mastopathy (class 3)—Fibro-adenoma (class two). That is why the satisfactory separation between class 2 and 4 can be observed because class 4 is very early stage and class 2 is fully developed stage (late). Briefly, the breast is normally composed of fat, connective tissue and glands (glandular tissue)—the higher proportion of Glandular (Class 4) tissue, the denser the breast. Carcinoma (Class 1) tissue. Breast cancer is cancer that starts in the tissues of the breast. There are two main types of breast cancer: Ductal carcinoma starts in the tubes (ducts) that move milk from the breast to the nipple. Fibroadenoma (class two) is the presence of benign cysts, noncancerous lumps, and pain in the tissues of the breast and is made up of breast gland tissue and tissue that helps support the breast gland tissue. Mastopathy (class 3) is the presence of benign cysts, noncancerous lumpiness, and pain in the tissues of the breast occurs when this connective tissue changes. The breast includes fatty tissue and fibrous connective (Class 5) tissue that give the breast its size and shape. An increase of connective tissue causes nodule changes that give rise to glandular cysts. The collection of fat cells is called adipose (Class 6) tissue.

The original nine variables are sufficient to give 100% separation for nine pairs: between classes 1&4, 1&5, 1&6, 2&5, 2&6, 3&5, 3&6, 4&5 and 4&6, the nine variables are sufficient to give 90%-99% separation between the pairs 1&2 and 5&6. Pairs 2&4 and class 1&3 are improved significantly in separation from 41% to 79% and 67% to 78%, respectively. For classes 2&3 and 3&4, the original nine variables fail to separate the two classes. It is possible that the two classes are from the same or similar population that cannot be separated. Class two is the non-deadly tumor "fibro-adenoma" while class 3 is composed of cyst "Mastopathy" tissue, and both are found in the presence of benign cysts or noncancerous lumps. Class 4 is for the normal "glandular" breast tissue. This may also explain the satisfactory separation between classes 2 and 4; these classes are very different in nature. Class 4 tissue is normal gland tissue, and class two is a fully developed stage of non-deadly breast tumor. This analysis was arrived without the necessity of analyzing extensive experimental point plots and determining what % from a visual perspective constituted the separation of the fifteen pairs of classes. Hyperspace and MVA analyses are not necessary when using the DS90-LROC methods. The one value of DS90 provides considerable information with respect to separating and determining the types of breast tissue from the normal to cancerous types.

Figure 10:
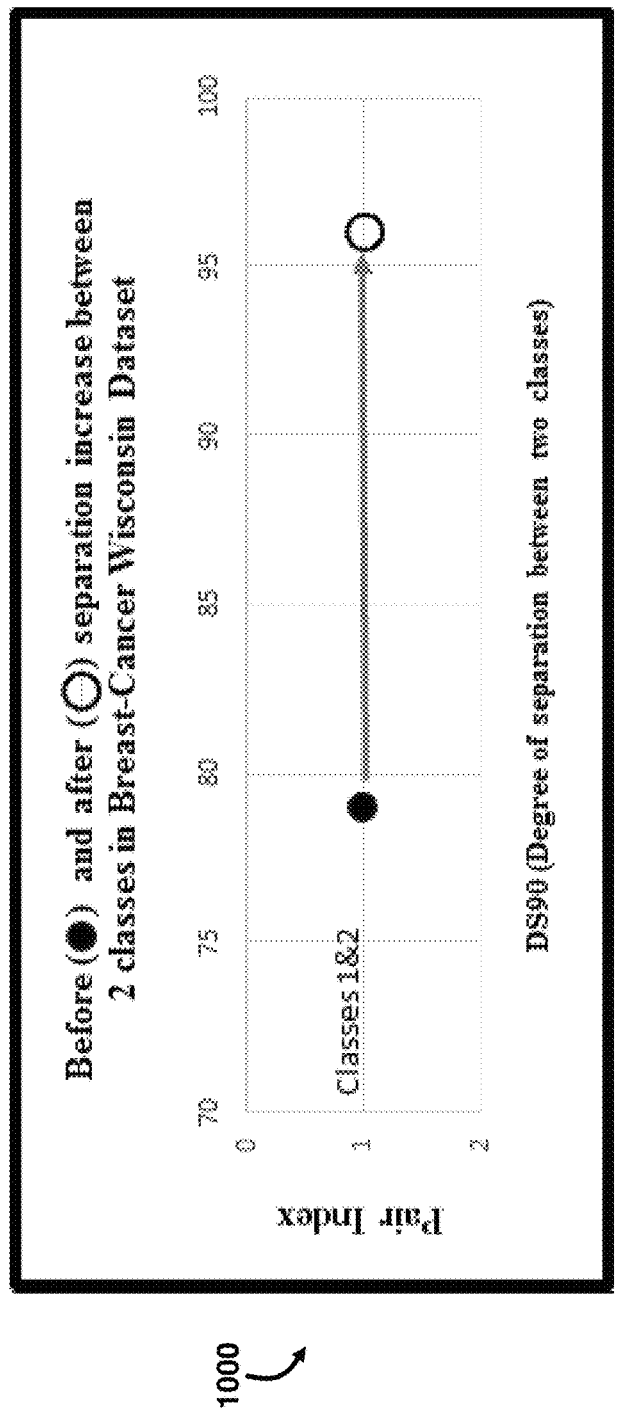
FIG. 10 is a 2D plot of a different study of a breast cancer Wisconsin data set, whereby the data set contains the before and after (enhanced) separation increase between the two classes (benign=class 1, malignant=class 2) using (steps 1-3 in FIG. 1)

FIG. 10 is a 2D plot 1000 of the breast cancer Wisconsin data set before and after the separation increase between the two classes (Benign=class 1, Malignant=class two) using (steps 1-3 in FIG. 1) the DS90-LROC and variable combination of key variables approach. The original nine variables are sufficient to give a 96% separation between class 1&2 pairs. There are only four key variables (2, 3, 6 and 8) out of nine that made contribution to increase of separation between the two classes. This becomes a tool for researchers to look for new variables beyond the nine original variables that may lead to 100% separation between class 1&2 pairs.

Figure 11A:
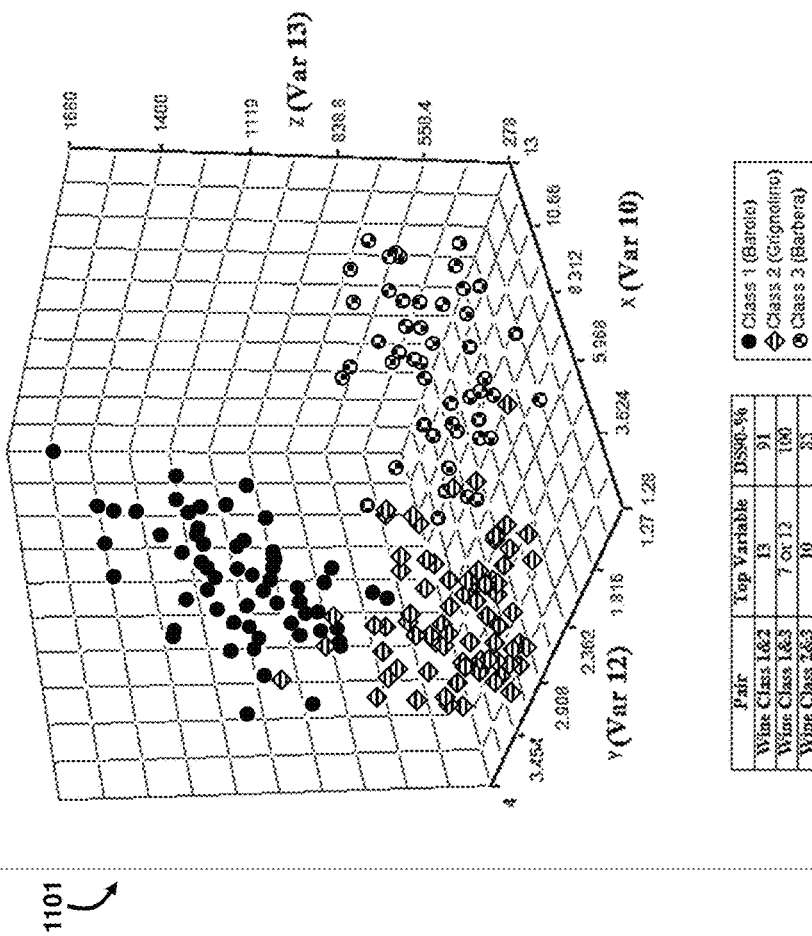
FIG. 11(a) is a graph illustrating a comparison of 3D data analyses of the Italian wine data set (from FIGS. 3-6) using the top separating variables (10, 12, and 13)
Figure 11B:
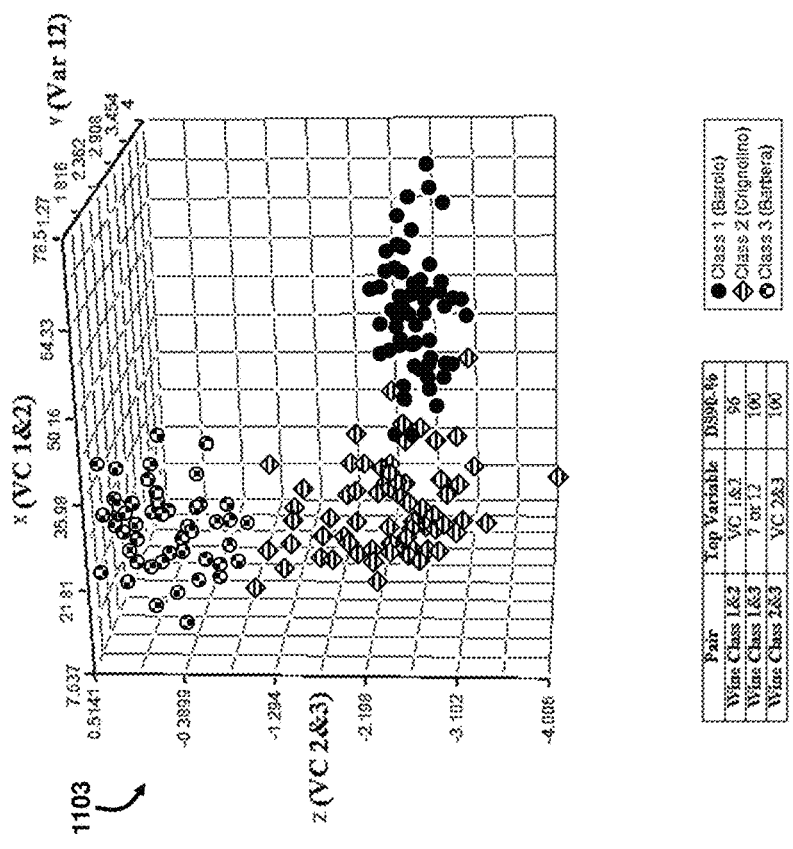
FIG. 11(b) is a graph illustrating a comparison of 3D data analyses of steps 1-4 in FIG. 1.
Figure 11C:
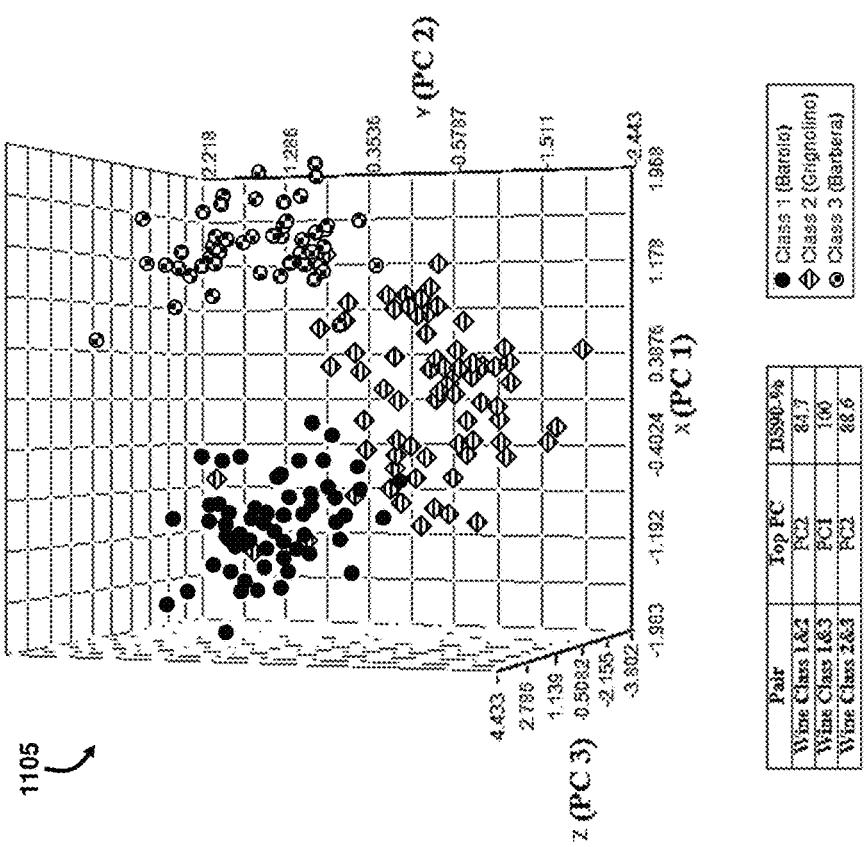
FIG. 11(c) is a graph illustrating a comparison of 3D analyses of the conventional PCA.
Figure 12A:
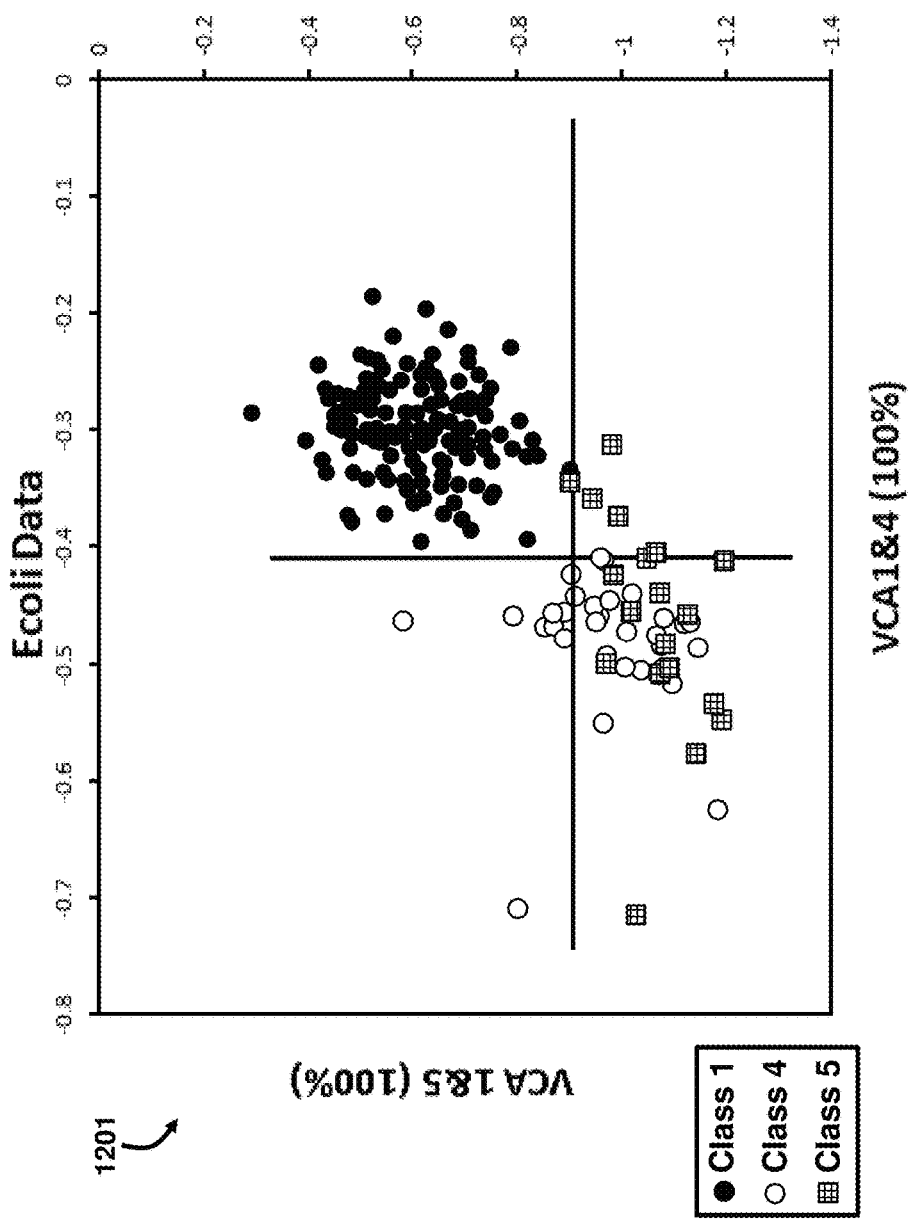
FIGS. 12(a) through 12(f) are graphs illustrating 2D visualizations of the *E. coli* data set.
Figure 12B:
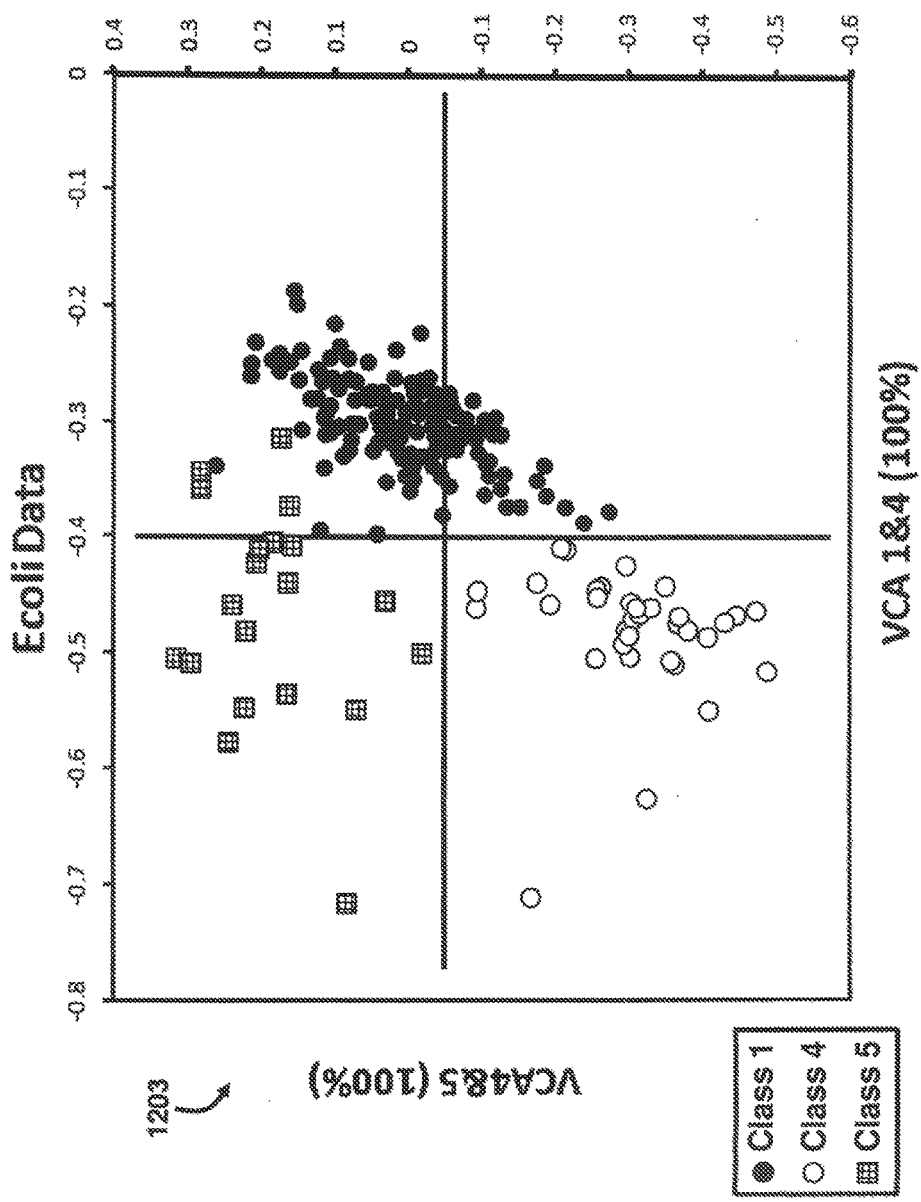
Figure 12C:
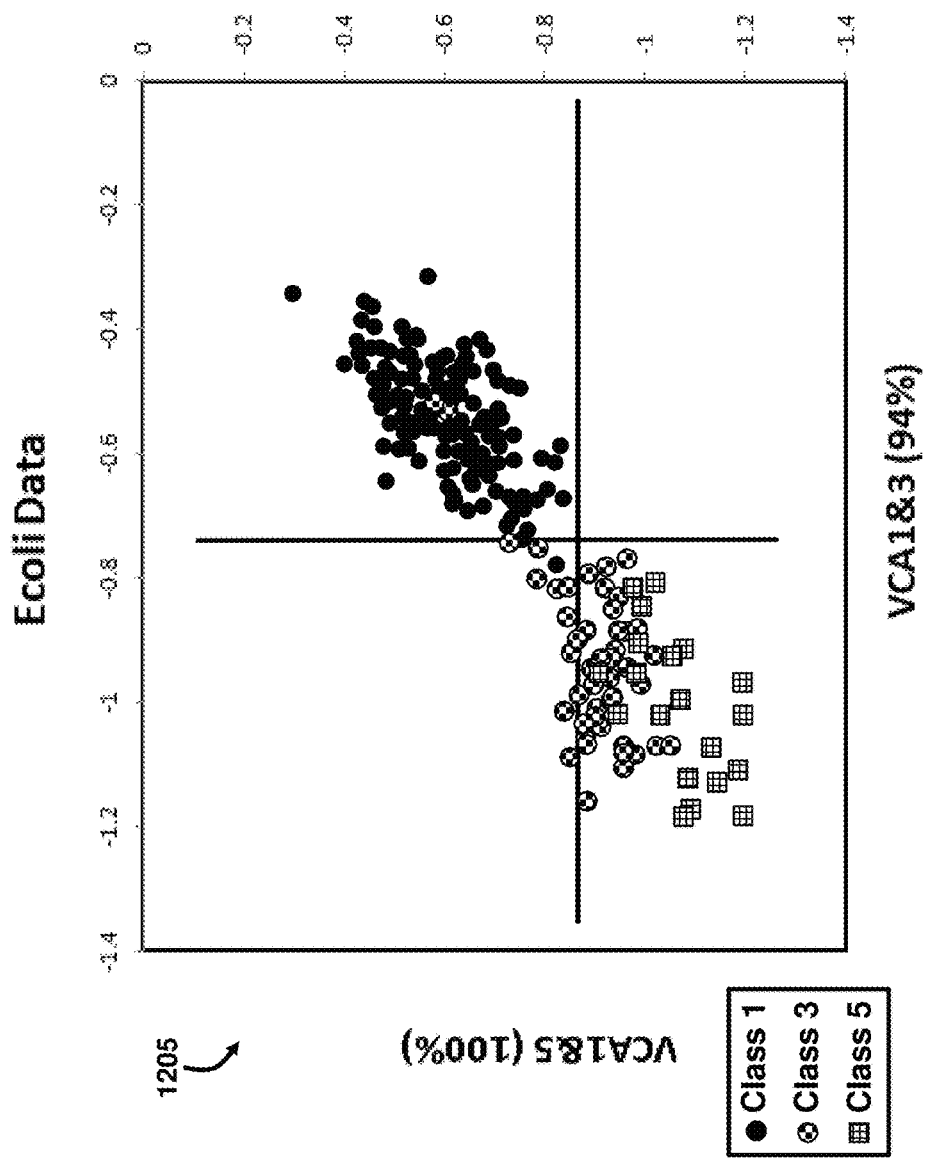
Figure 12D:
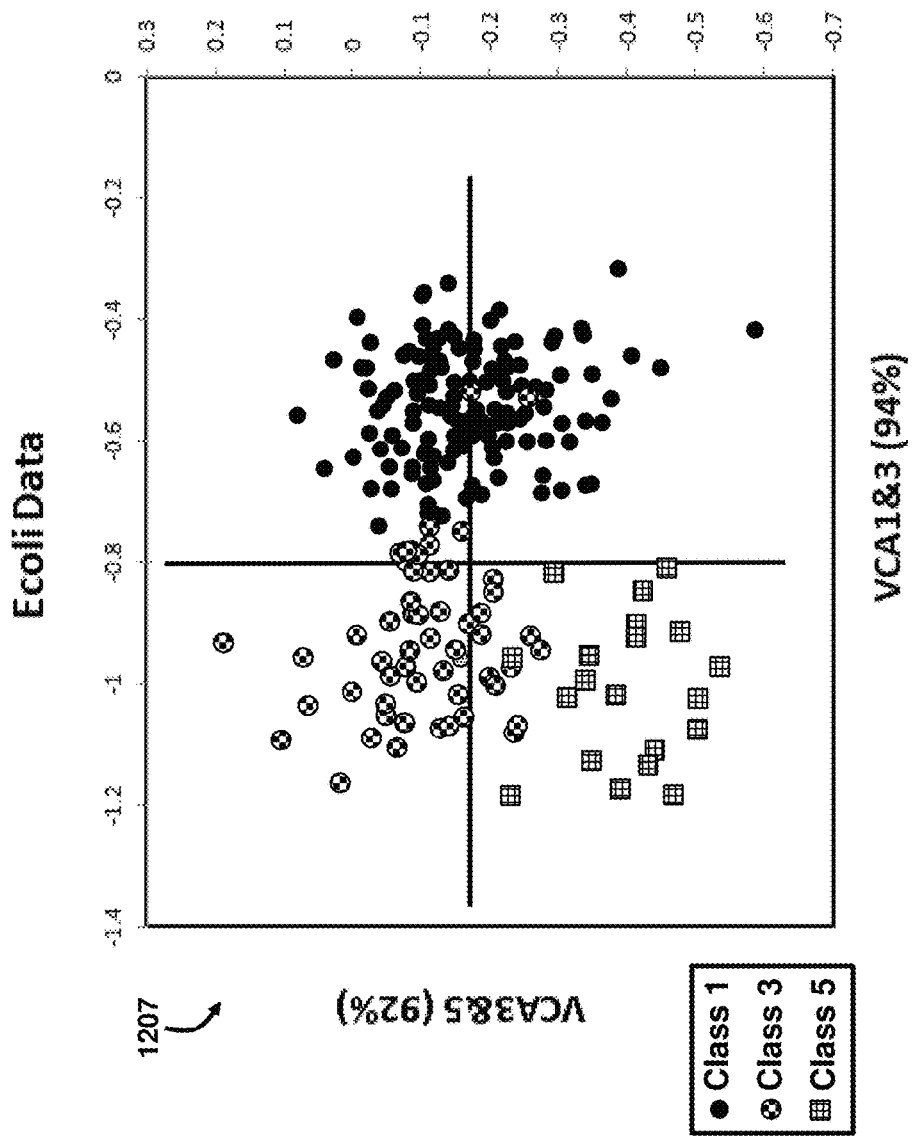
Figure 12E:
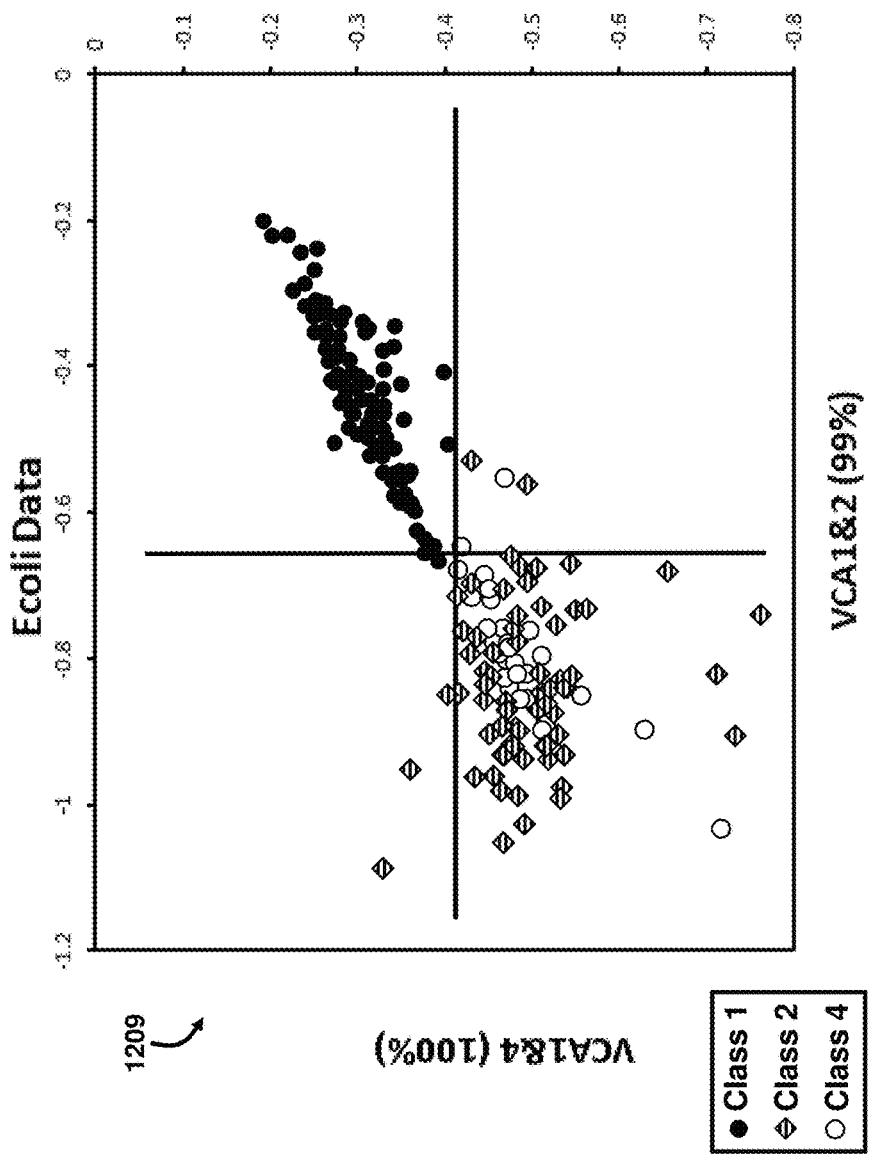
Figure 12F:
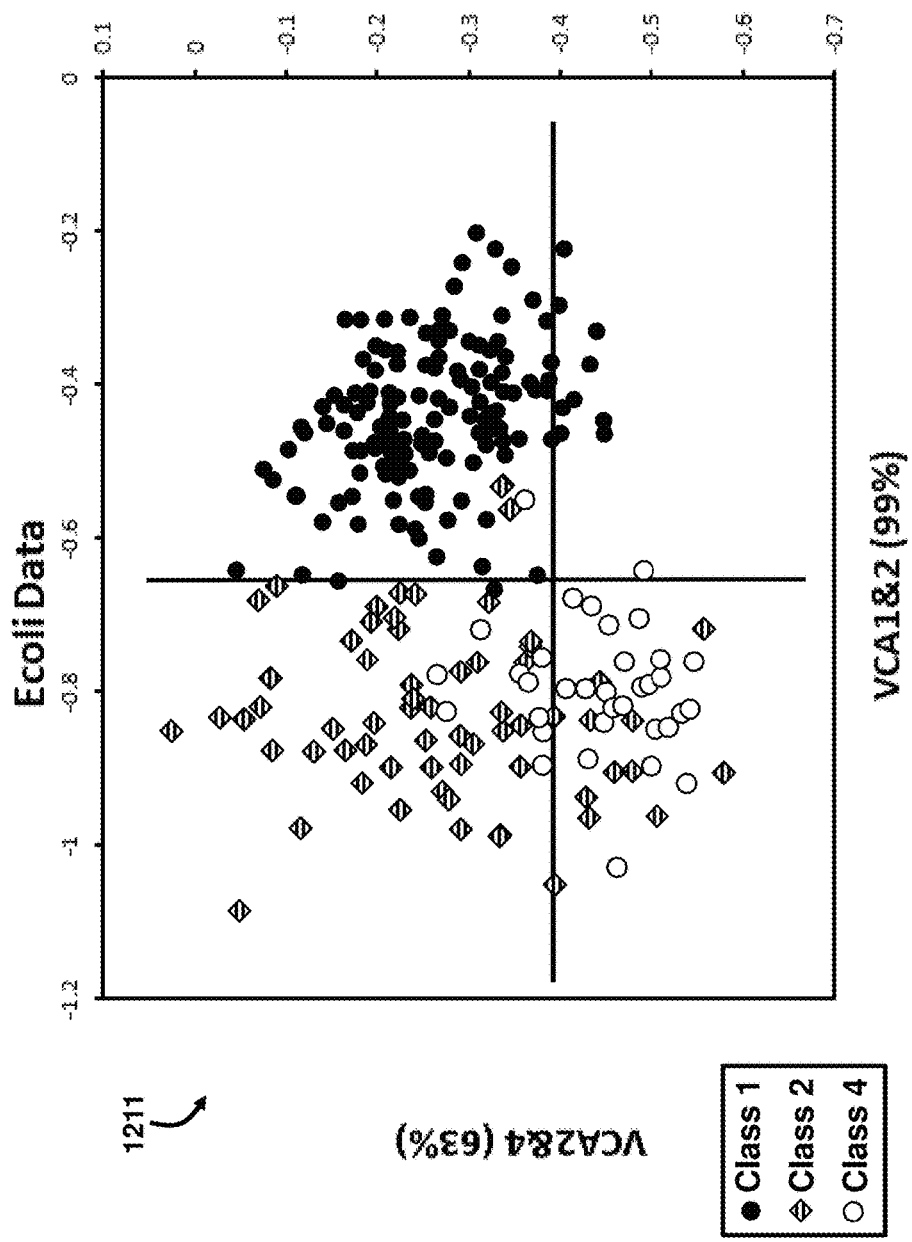

FIGS. 11(*a*) through 11(*c*) are 3D comparisons of visualizations of the Italian wine data set using the top DS90 separation variables (10, 12 and 13, FIG. 3) shown in the 3D plot 1101 of FIG. 11(*a*), the embodiments herein (steps 1-4 in FIG. 1) shown in the 3D plot 1103 of FIG. 11(*b*), and the PCA conventional solution in the 3D plot 1105 shown in FIG. 11(*c*). The insert tables show the ability of each axis in 3D space to separate each of the three pairs. The PCA conventional solution (plot 1105 of FIG. 11(*c*)) gave similar results as of using the top 3 separating variables (plot 1101 of FIG. 11(*a*)), separating the three classes with (>85%). The 3D pairs-space (plot 1103 of FIG. 11(*b*)) gave significant separation between the three classes (>96%) and clearly overall better separation results than FIGS. 11(*a*) and 11(*c*). The embodiments herein indicate that each pair has an optimum axis where the two classes' data points are maximally or fully separated. A data set with three classes will generate three pairs, and the three pairs will generate three optimum axes or 3D pairs-space. Similarly, if there is a data set with six classes, the optimum number of axes is fifteen (15D pairs-hyperspace). If all pairs reached 100% separation that will yield to this phenomenon, any three classes will occupy a 3D space in a 15D space by themselves. This means any three classes in 3D can be displayed using the 15D space values without any modifications.

FIGS. 12(*a*) through 12(*f*) show 2D visualizations of the *E. coli* data set using the pairs-hyperspace (VCA 1&2, VCA 1&3 . . . VCA 4&5) from the embodiments herein (steps 3-5 in FIG. 1). FIG. 12(*a*) shows a 2D plot 1201 of VCA 1&4 vs VCA 1&5. The vertical line (FIG. 12(*a*)) shows how the two classes (class 1 and class 4) are fully separated (DS90=100%) by the x-axis (VCA 1&4). The horizontal line in the plot 1201 of FIG. 12(*a*) shows how the two classes (class 1 and class 5) are fully separated (DS90=100%) by the y-axis (VCA 1&5). The x-y plane generated by the two VCAs (VCA 1&4 and VCA 1&5) has one class in common and that is class 1. Class 1 occupies the center of the 2D plane (x-y plane) generated by VCA 1&4 and VCA 1&5 while Class 4 and class 5 occupy either on top of the x-y plane or bottom of the x-y plane. The plot 1203 of FIG. 12(*b*) shows this to be true, because class 5 occupies the top of the x-y plane while class 4 occupies the bottom of x-y plane. The vertical line in the plot 1203 of FIG. 12(*b*) shows how the two classes (class 1 and class 4) are fully separated (DS90=100%) by the x-axis (VCA 1&4). The horizontal line in the plot 1203 of FIG. 12(*b*) shows how the two classes (class 4 and class 5) are fully separated (DS90-100%) by the y-axis (VCA 4&5). The x-y plane generated by the two VCAs (VCA 1&4 and VCA 4&5) has one class in common and that is class 4. Class 4 occupies the center of the 2D plane (x-y plane) generated by VCA 1&4 and VCA 4&5. The other classes (class 2 and class 3) are not shown here because they are located perpendicular to the 3D space of VCA1&4, VCA1&5, and VCA4&5. The plot 1205 of FIG. 12(*c*) and plot 1207 of FIG. 12(*d*) show the 3D space of class 1, class 3, and class 5 using the 2D format approach as of FIGS. 12(*a*) and 12(*b*). The plots 1209, 1211 of FIGS. 12(*e*) and 12(*f*), respectively, show the 3D space of class 1, class 2, and class 4 using the 2D format approach of FIGS. 12(*a*) and 12(*b*). From FIGS. 12(*e*) and 12(*f*), it is clear that the two classes (2 and 4) cannot be separated with available variables, and this might be due to the fact that the class 2 proteins are an extension of the class 4 proteins. All proteins are initially created with a small leader or signal sequence of amino acids. This signal sequence is cleaved to form a slightly smaller protein. The physical difference between the two classes is minimal and it is probable that this is the cause of the separation difficulty.

Figure 13A:
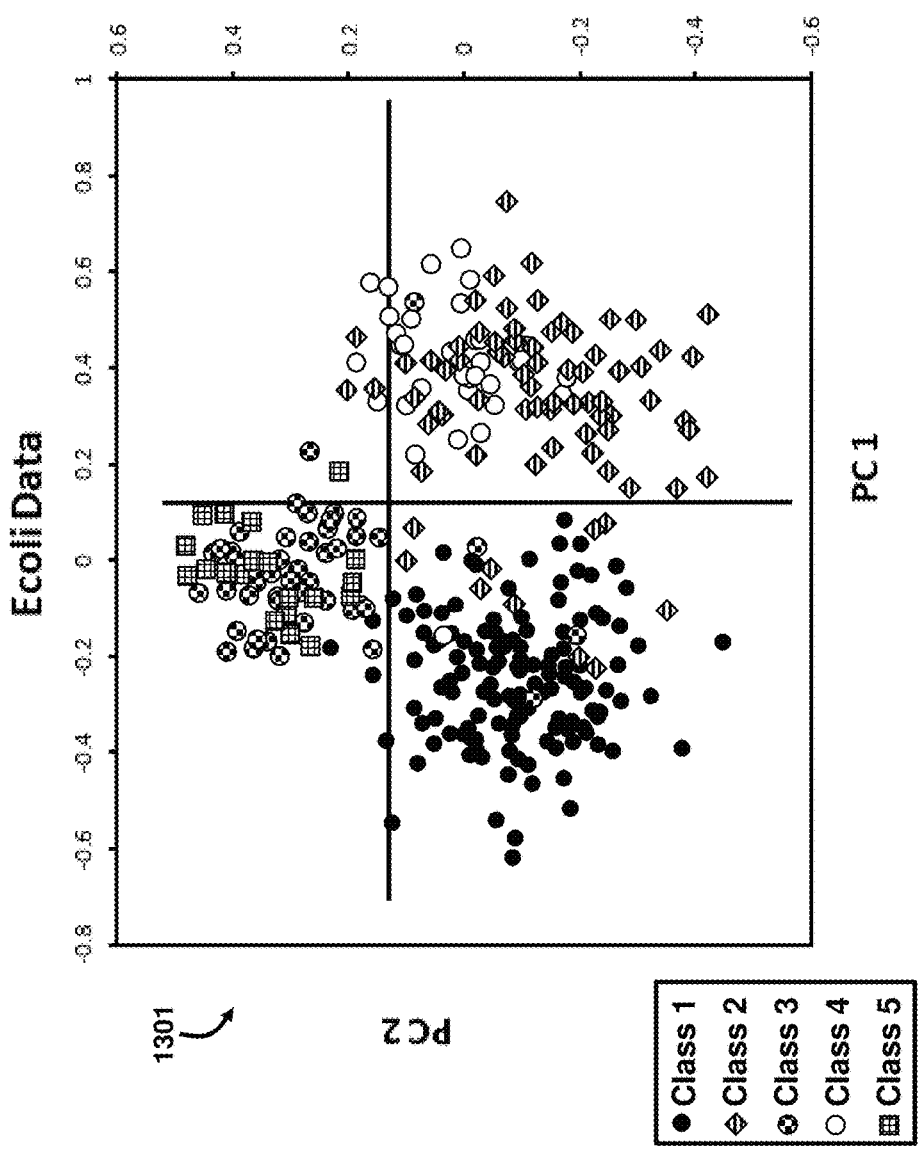
FIGS. 13(a) and 13(b) are graphs illustrating 2D visualizations of the *E. coli* data set using the three principal components from PCA analysis.
Figure 13B:
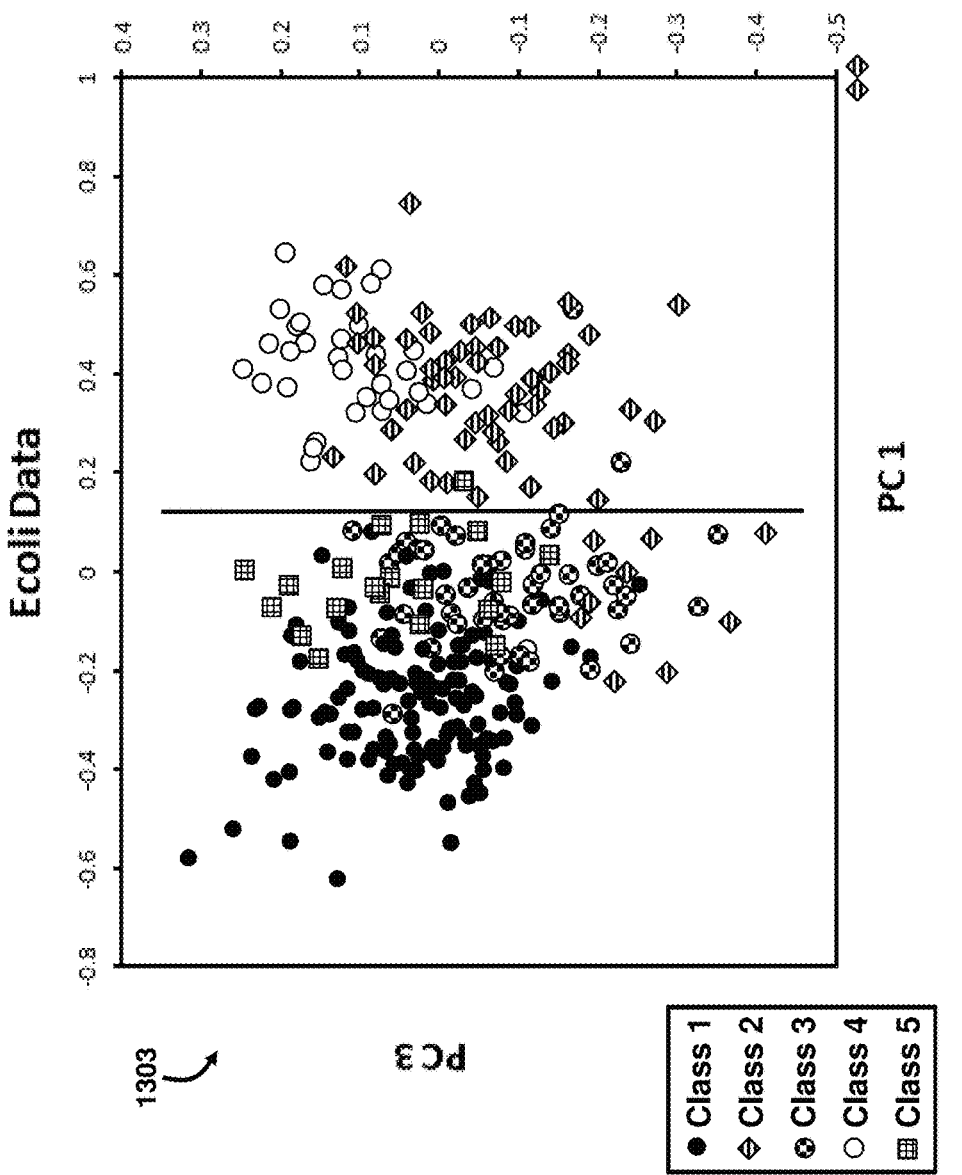
Figure 14A:
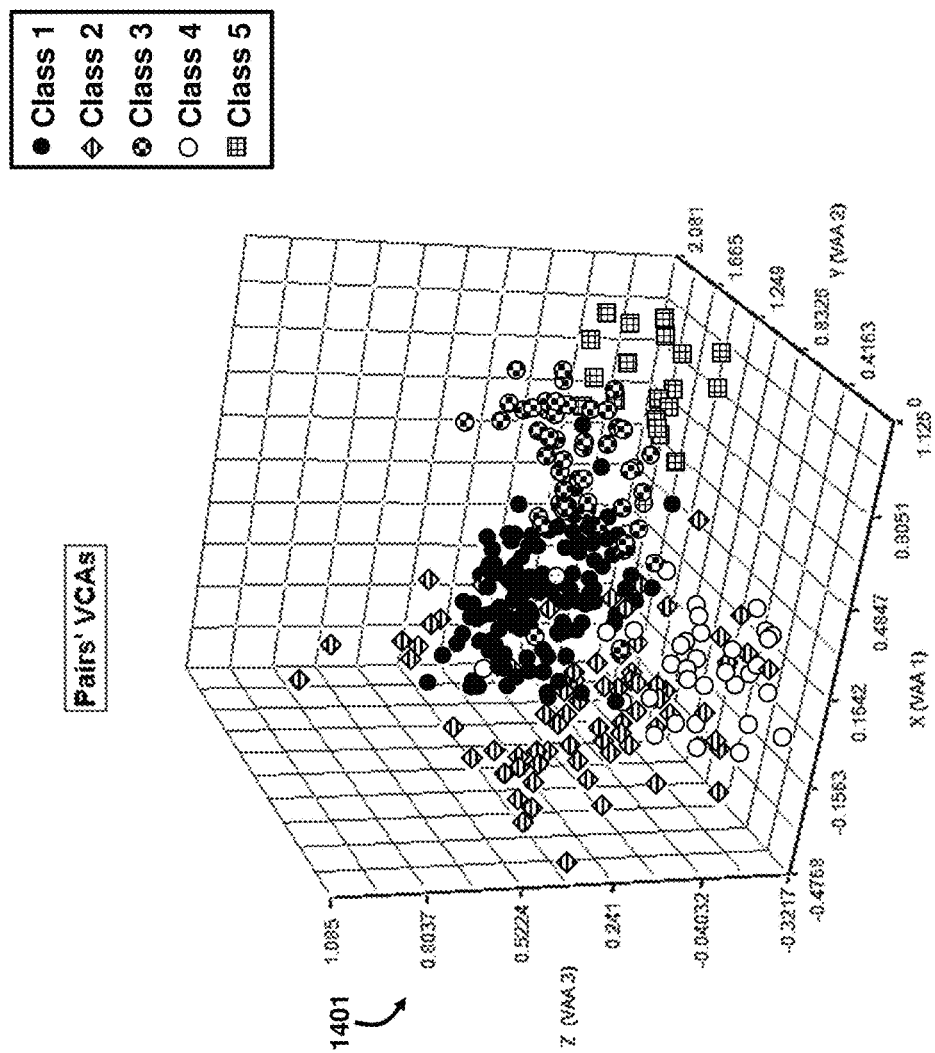
FIGS. 14(a) through 14(f) are graphs illustrating 3D plots of the *E. coli* data points.
Figure 14B:
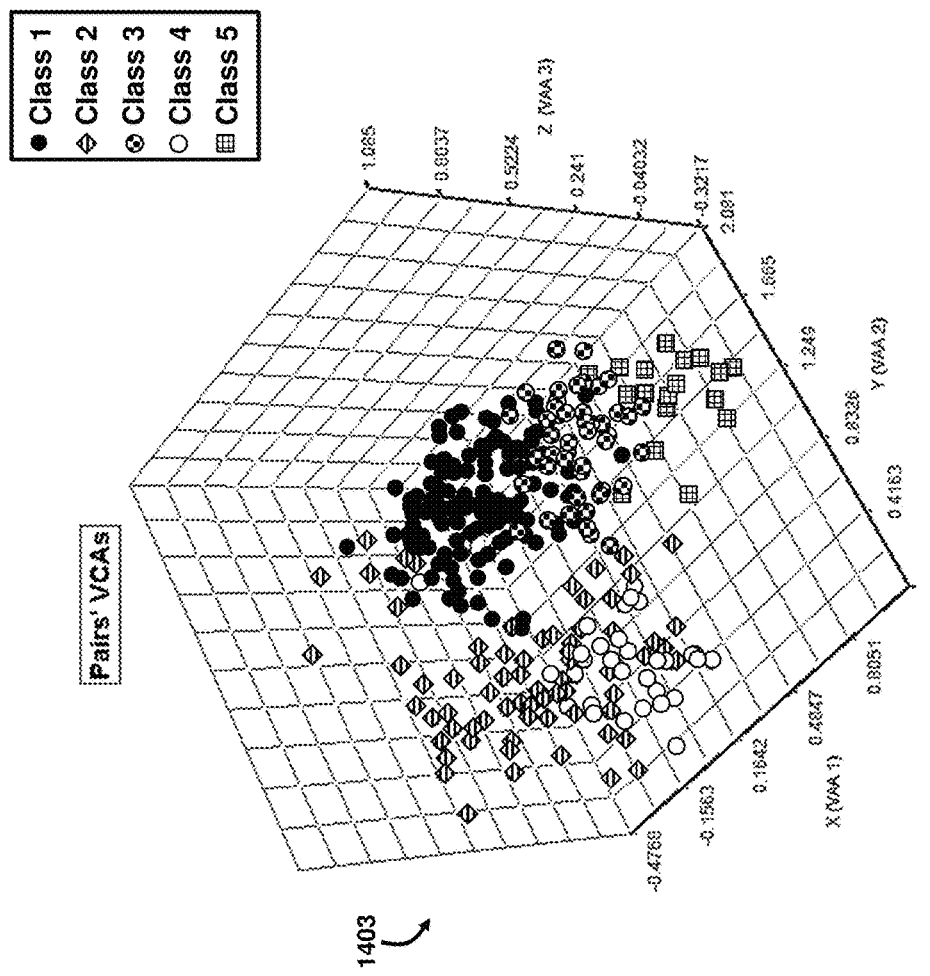
Figure 14C:
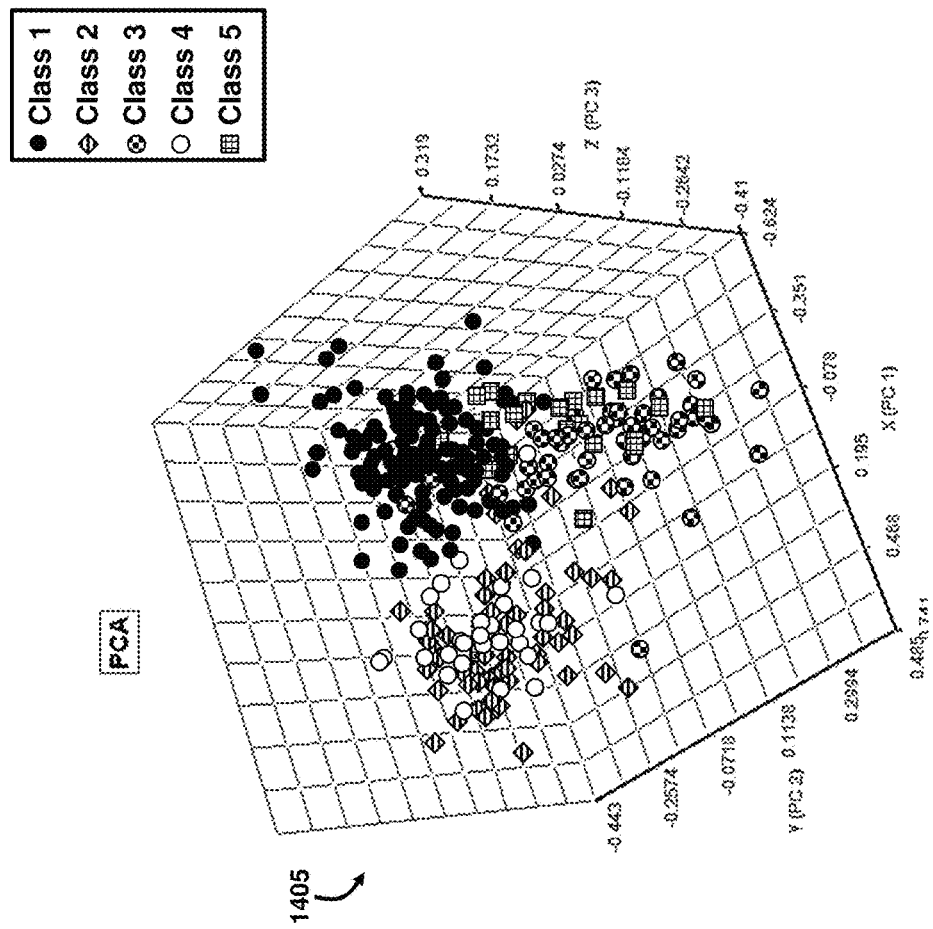
Figure 14D:
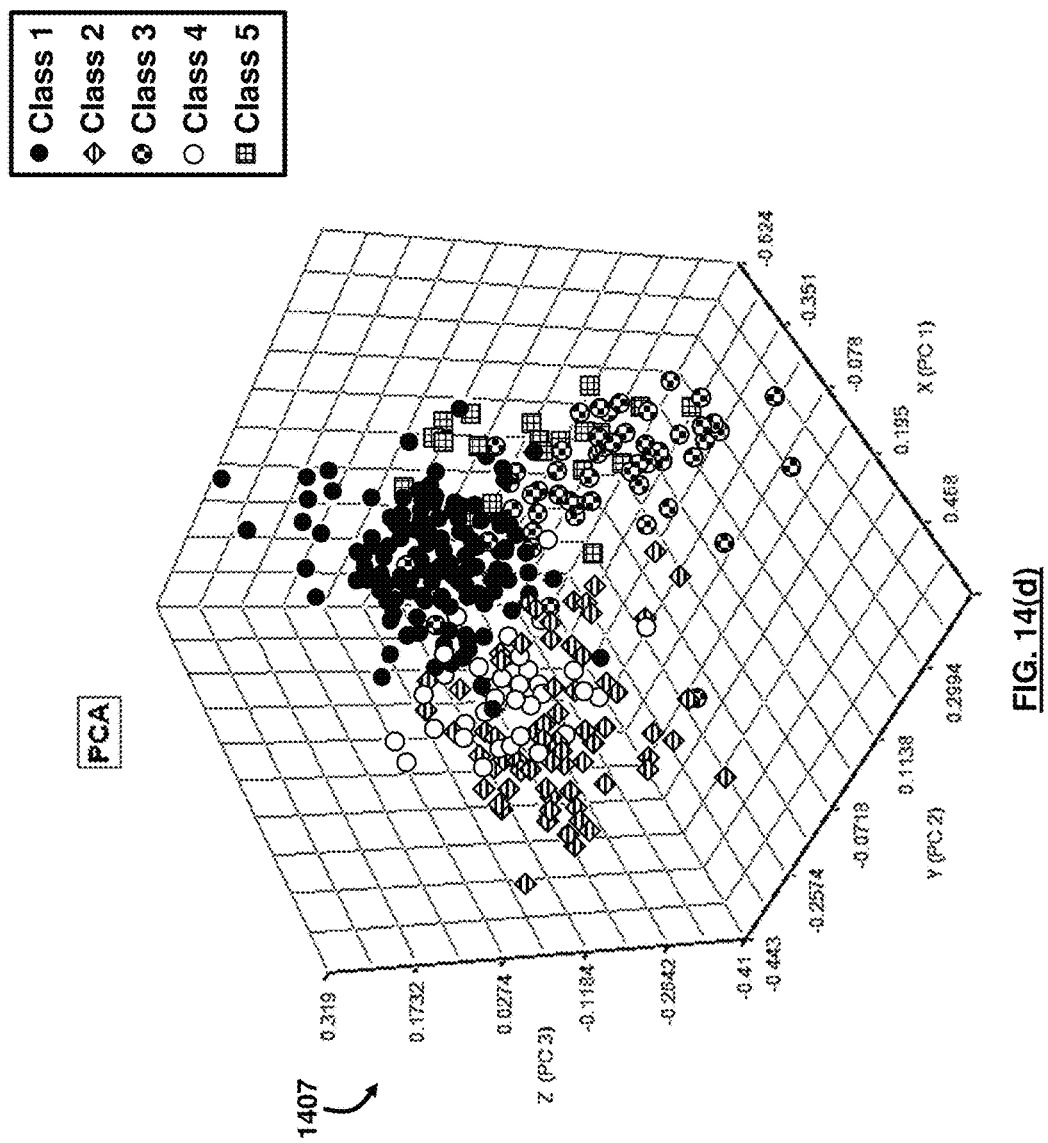
Figure 14E:
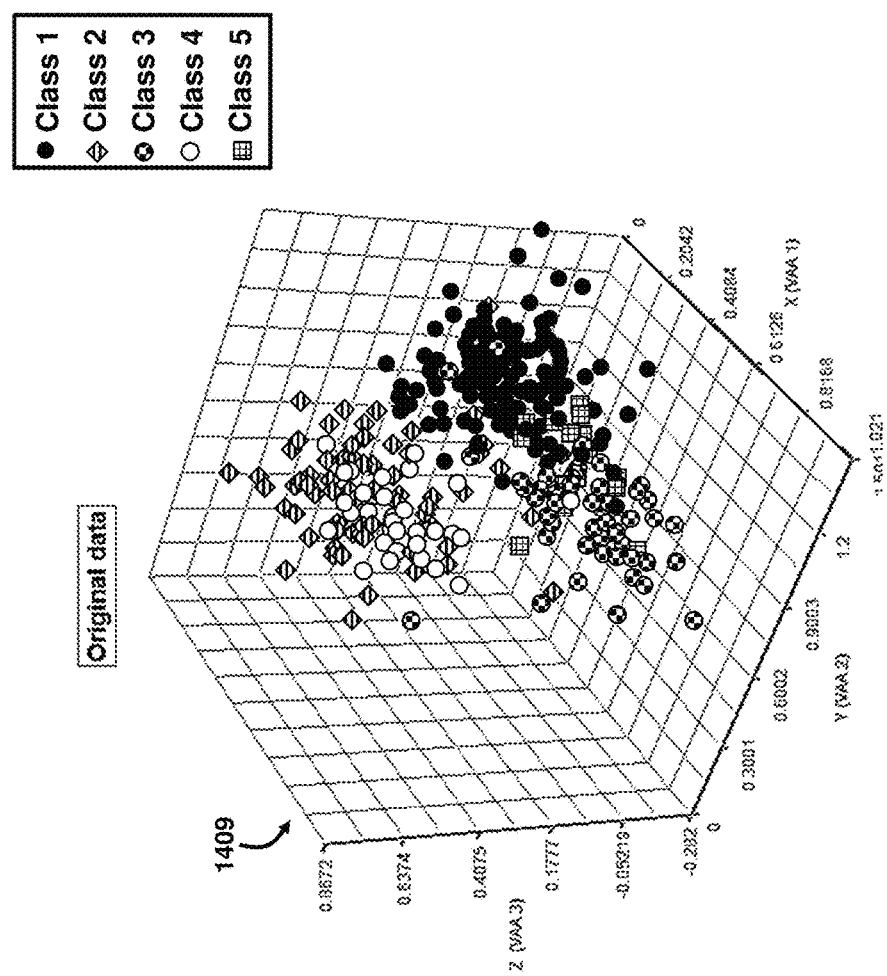
Figure 14F:
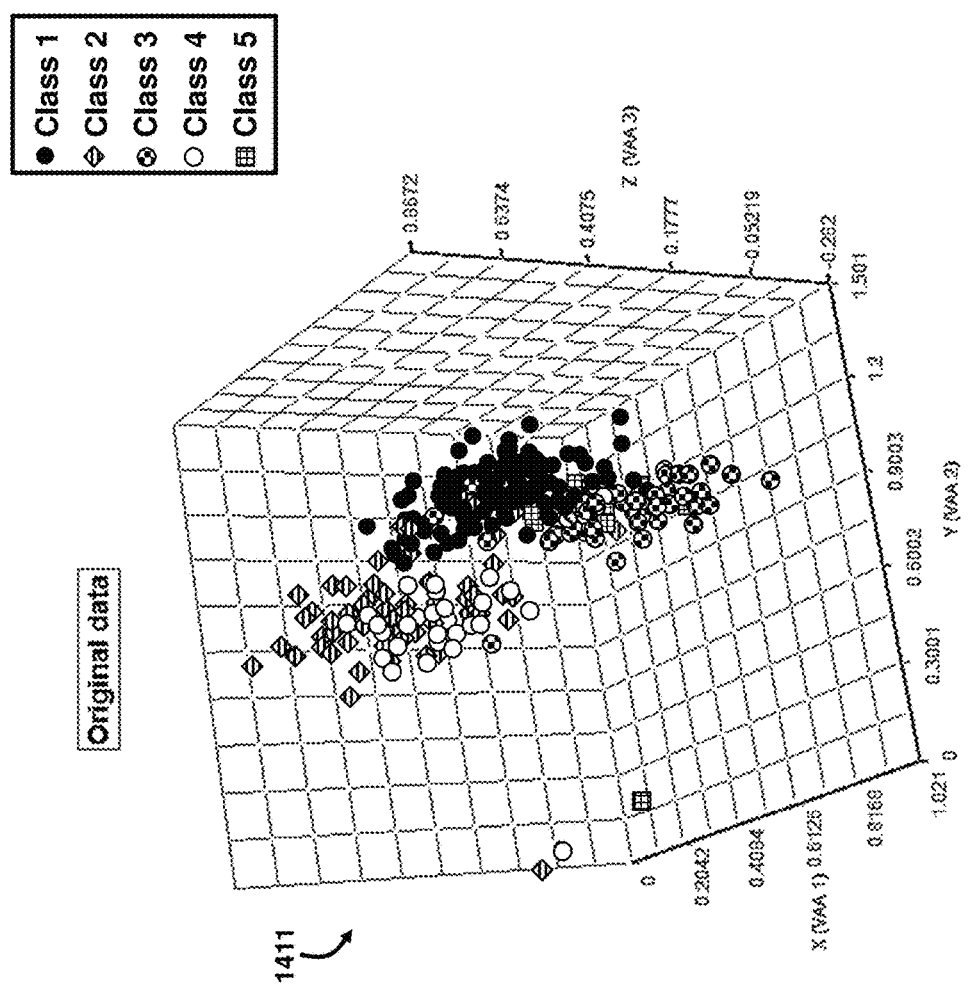
Figure 15A:
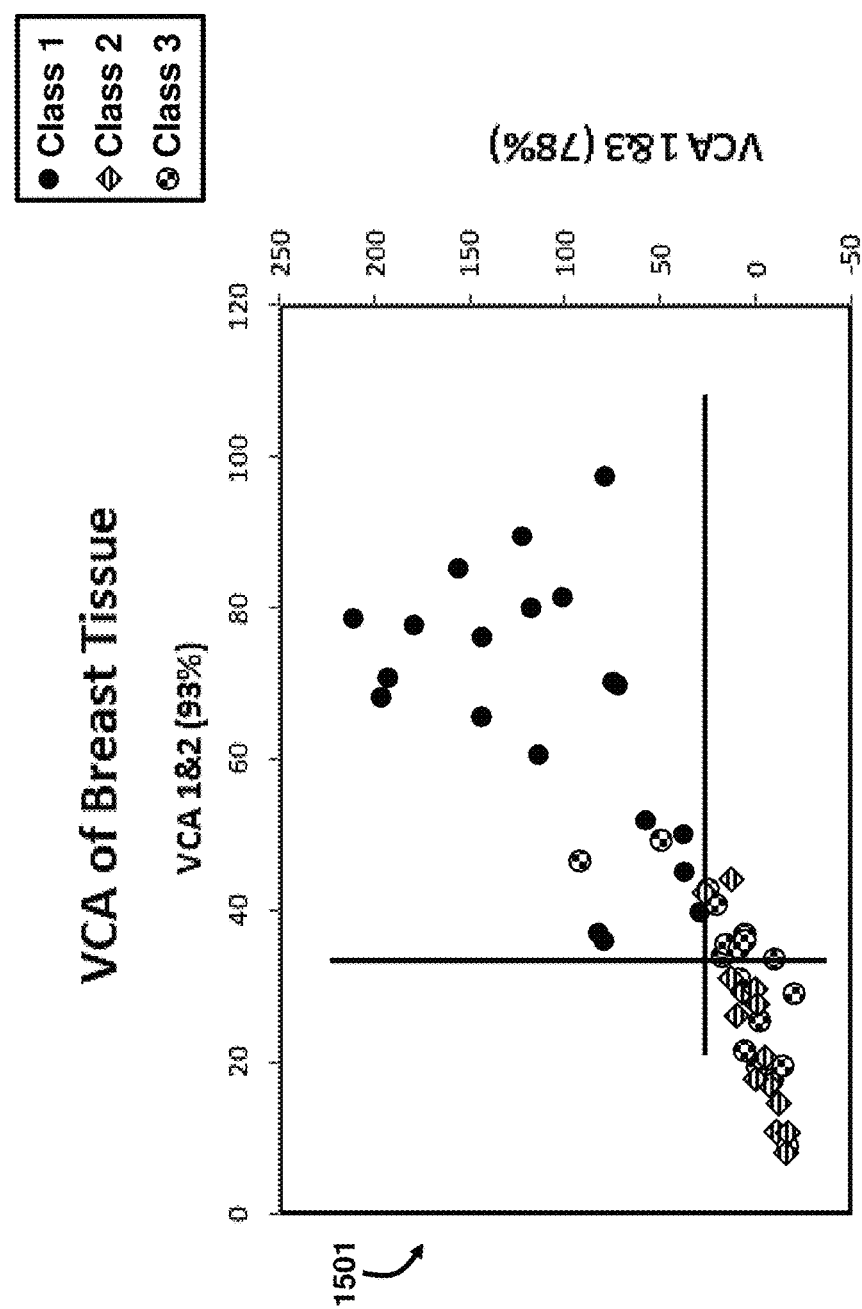
FIGS. 15(a) through 15(h) are graphs illustrating 2D visualizations of the breast tissue data set.
Figure 15B:
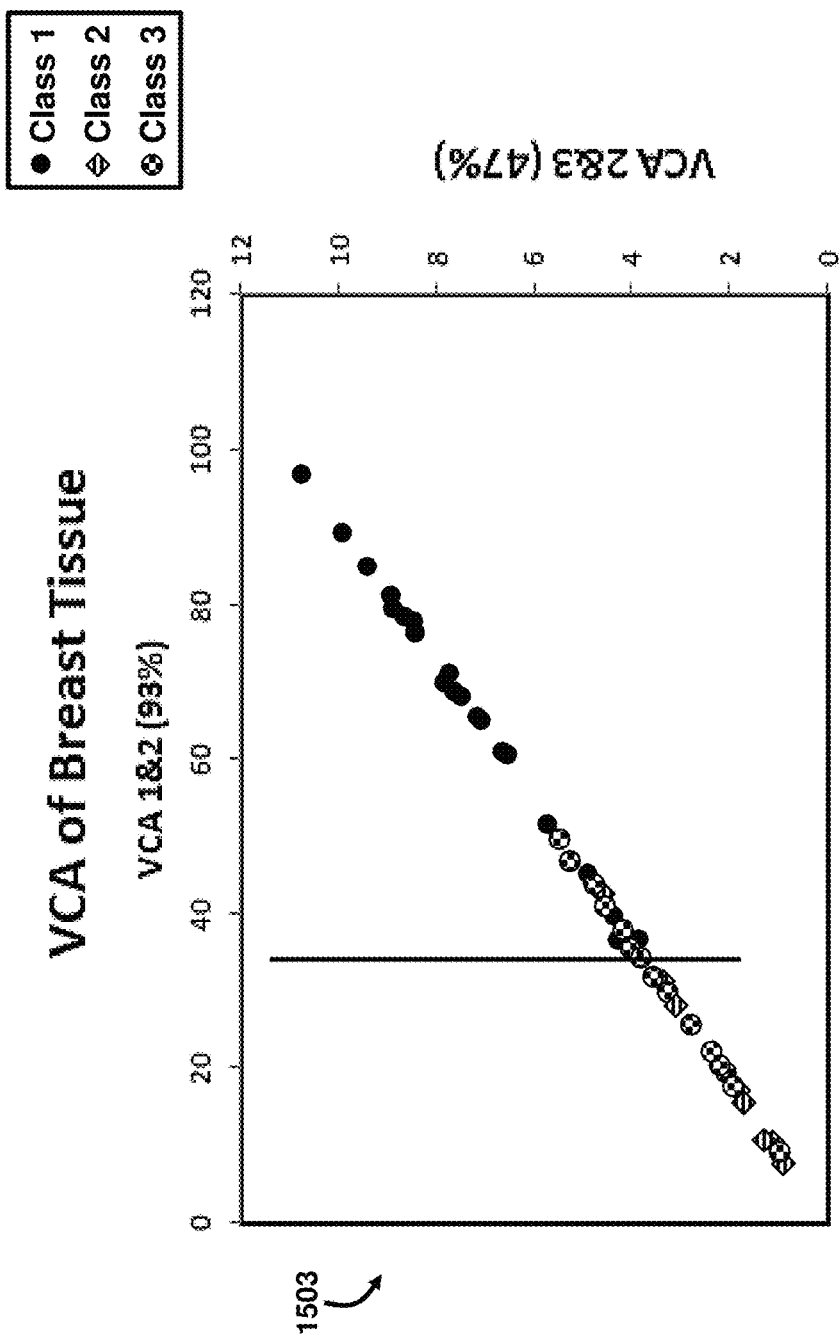
Figure 15C:
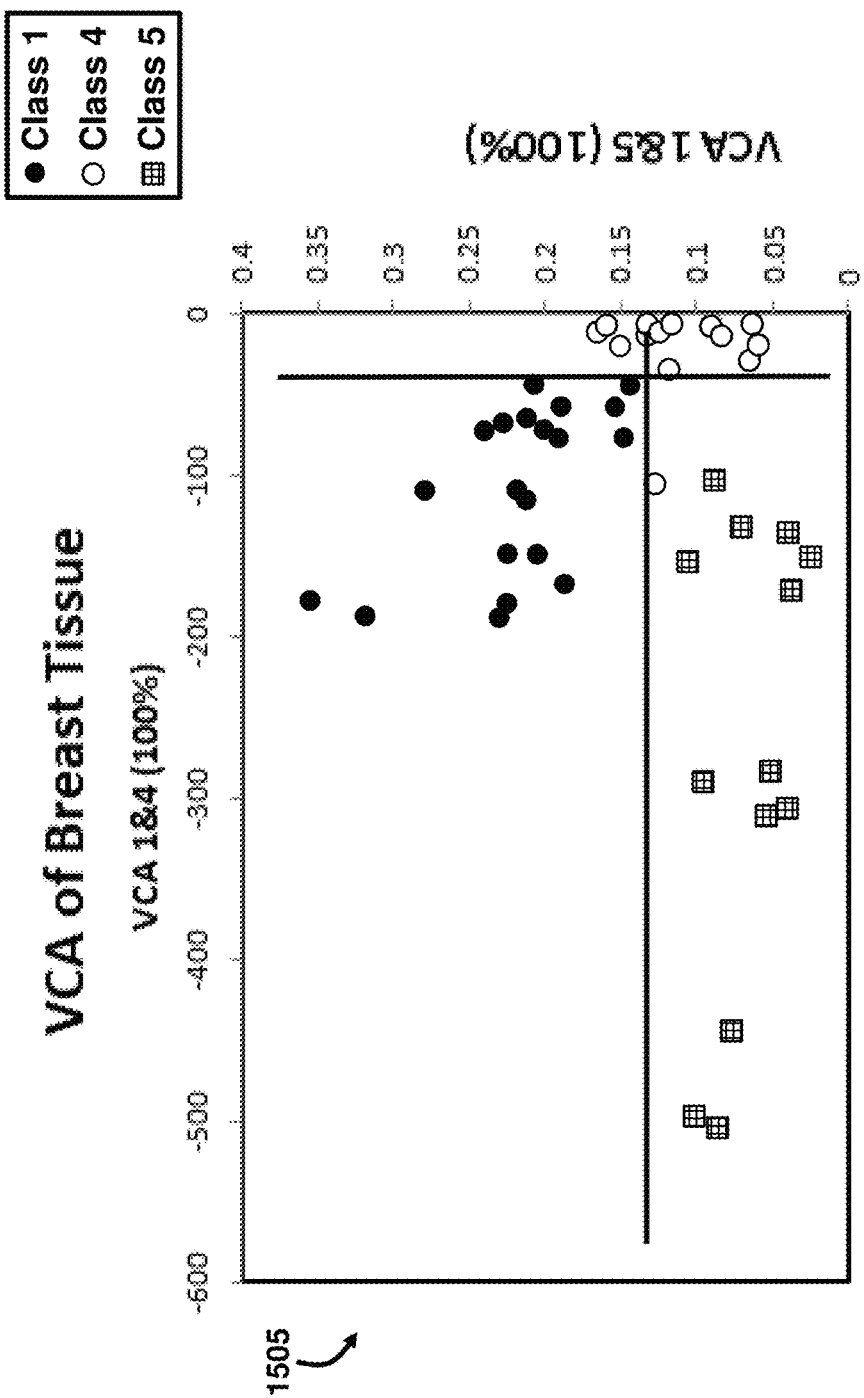
Figure 15D:
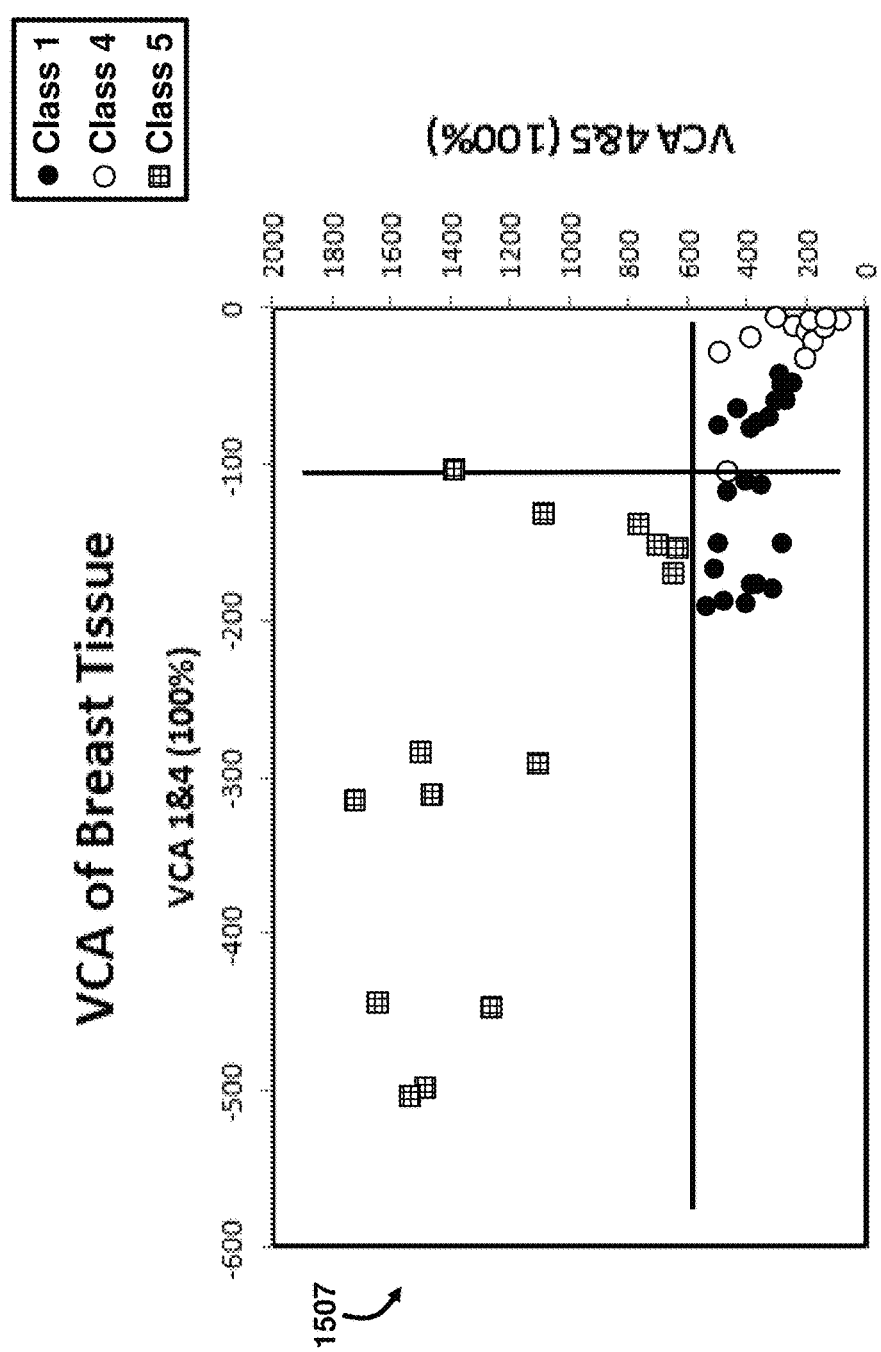
Figure 15E:
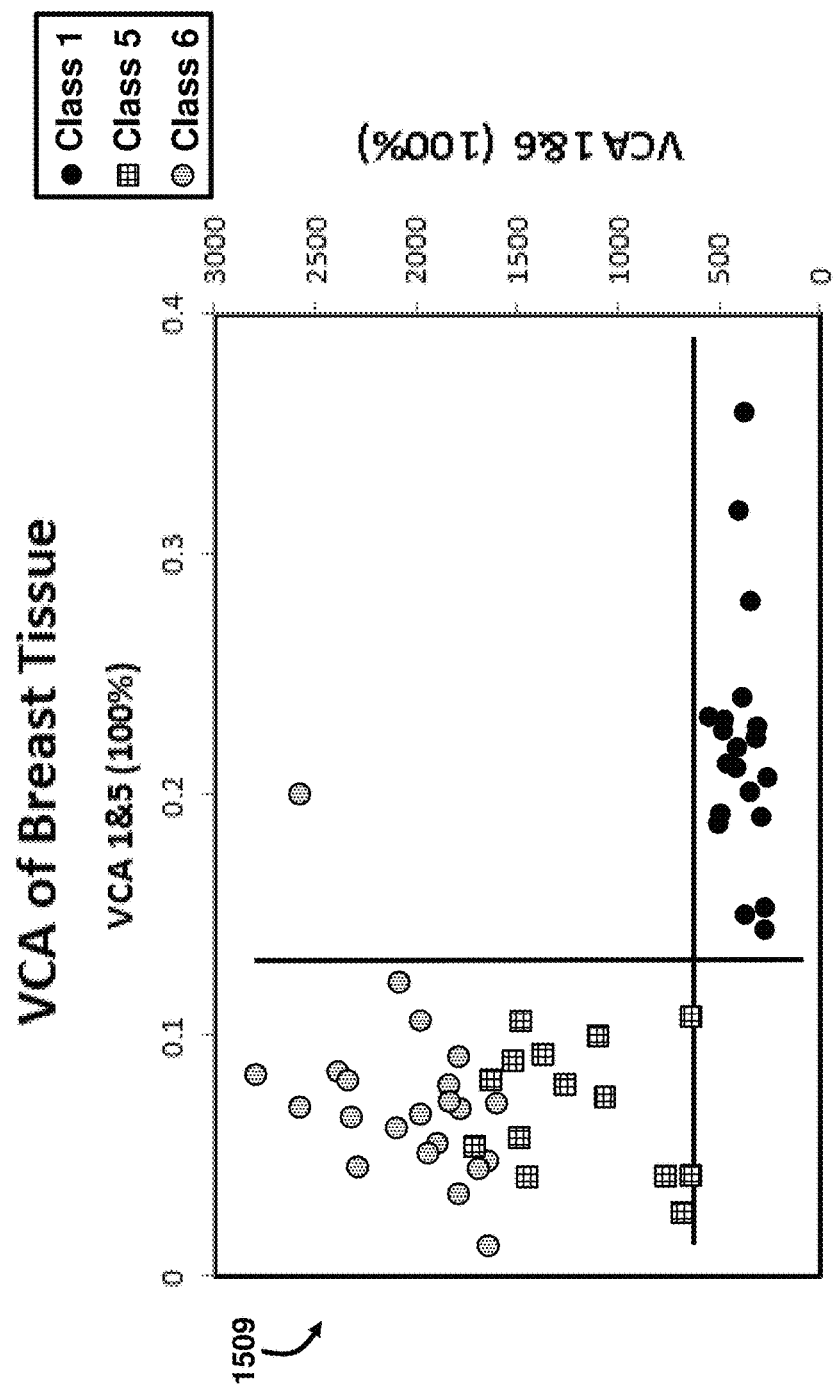
Figure 15F:
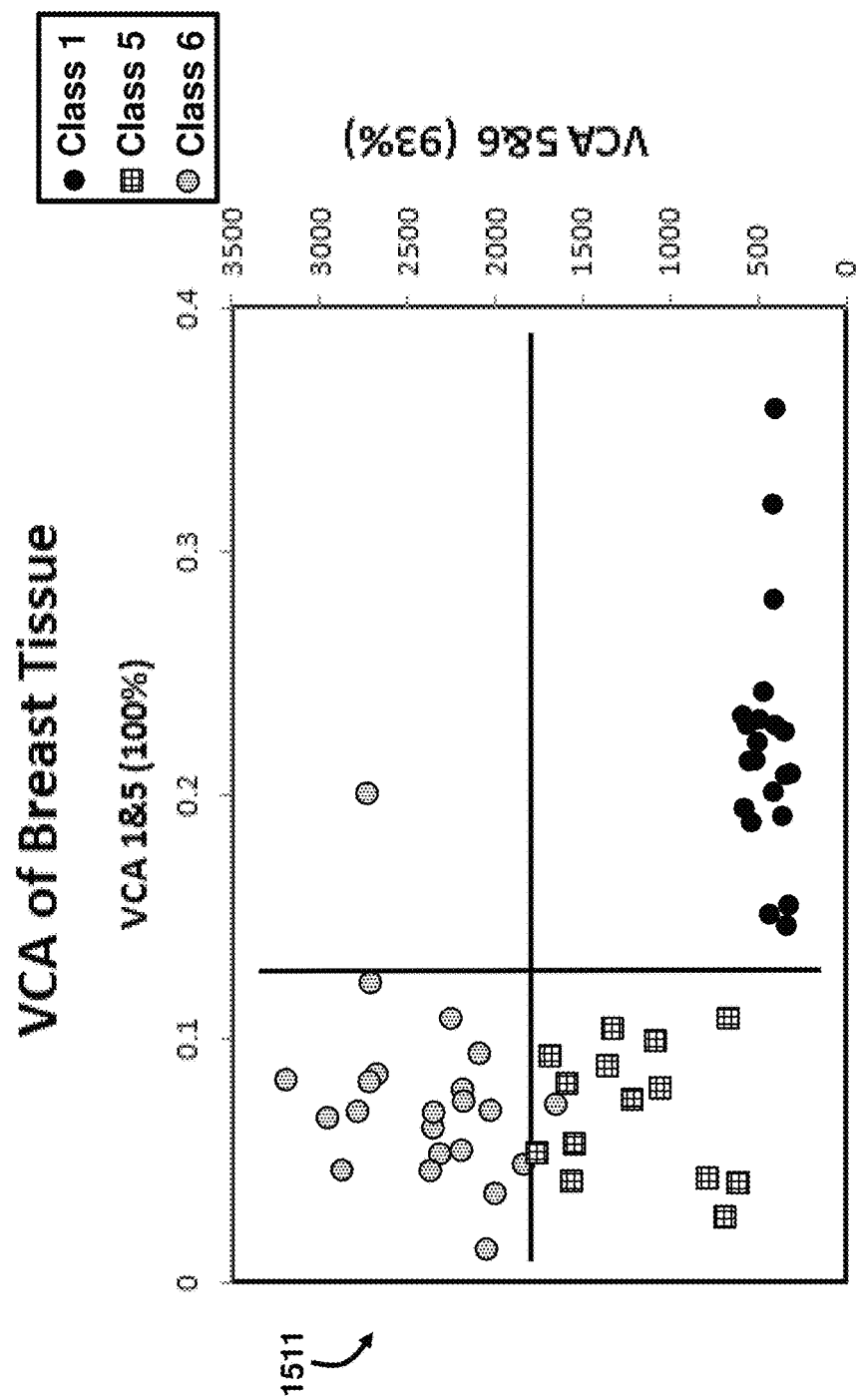
Figure 15G:
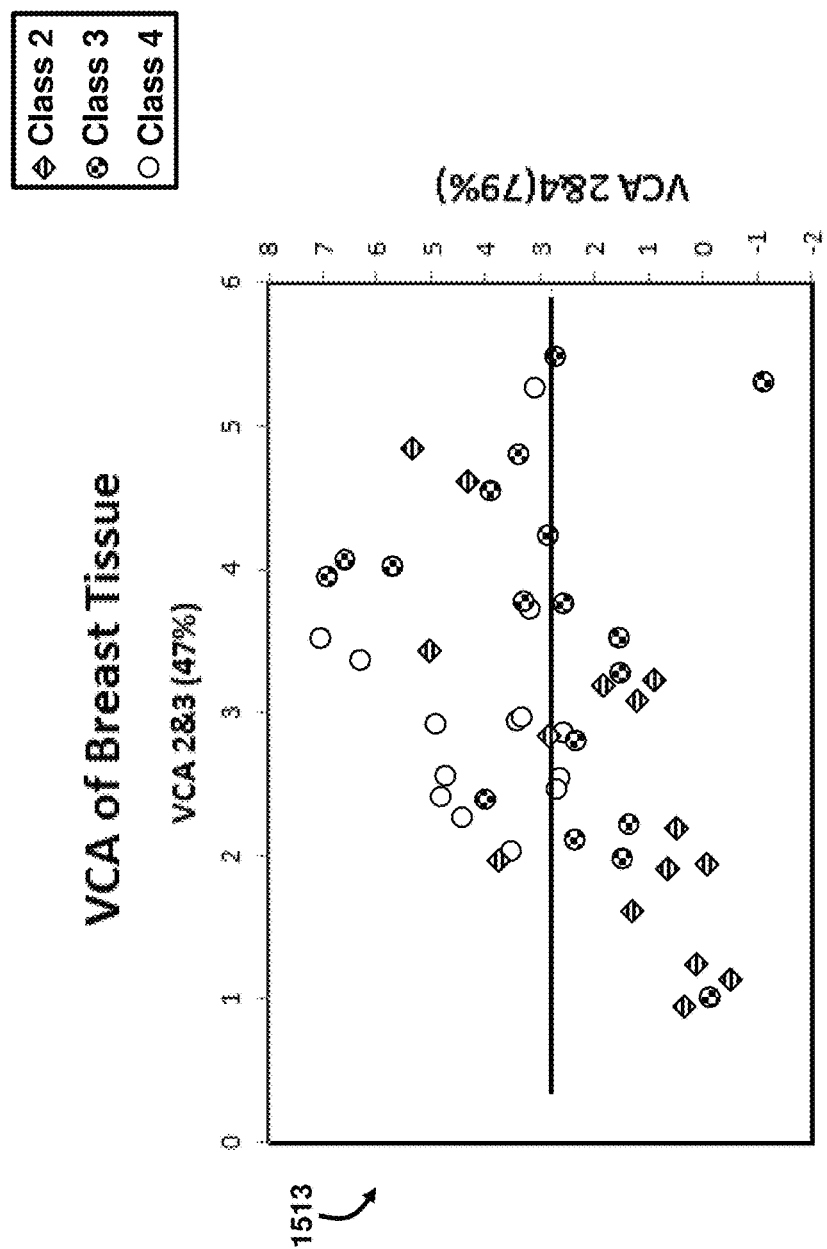
Figure 15H:
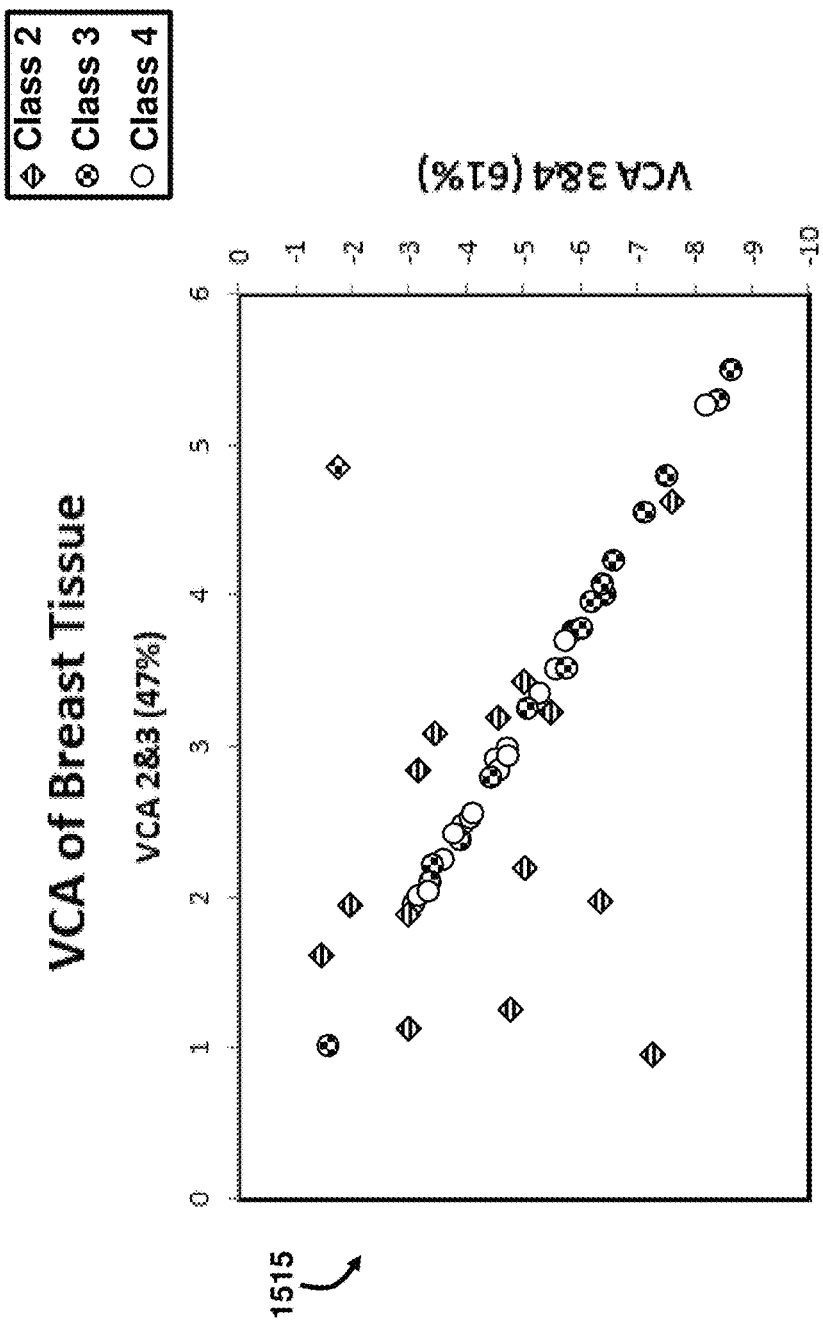
Figure 16A:
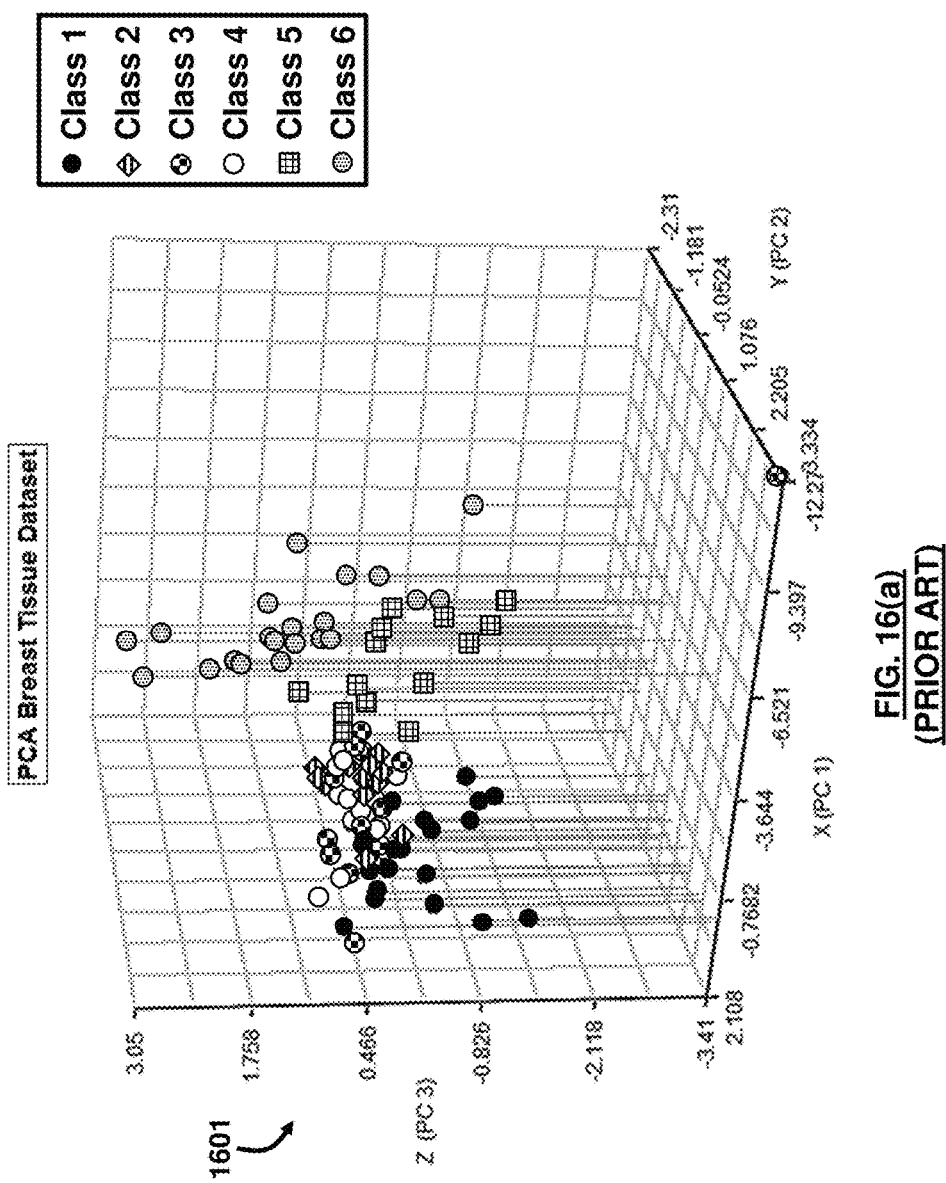
FIGS. 16(a) through 16(f) are graphs illustrating 3D plots of the breast tissue data points.
Figure 16B:
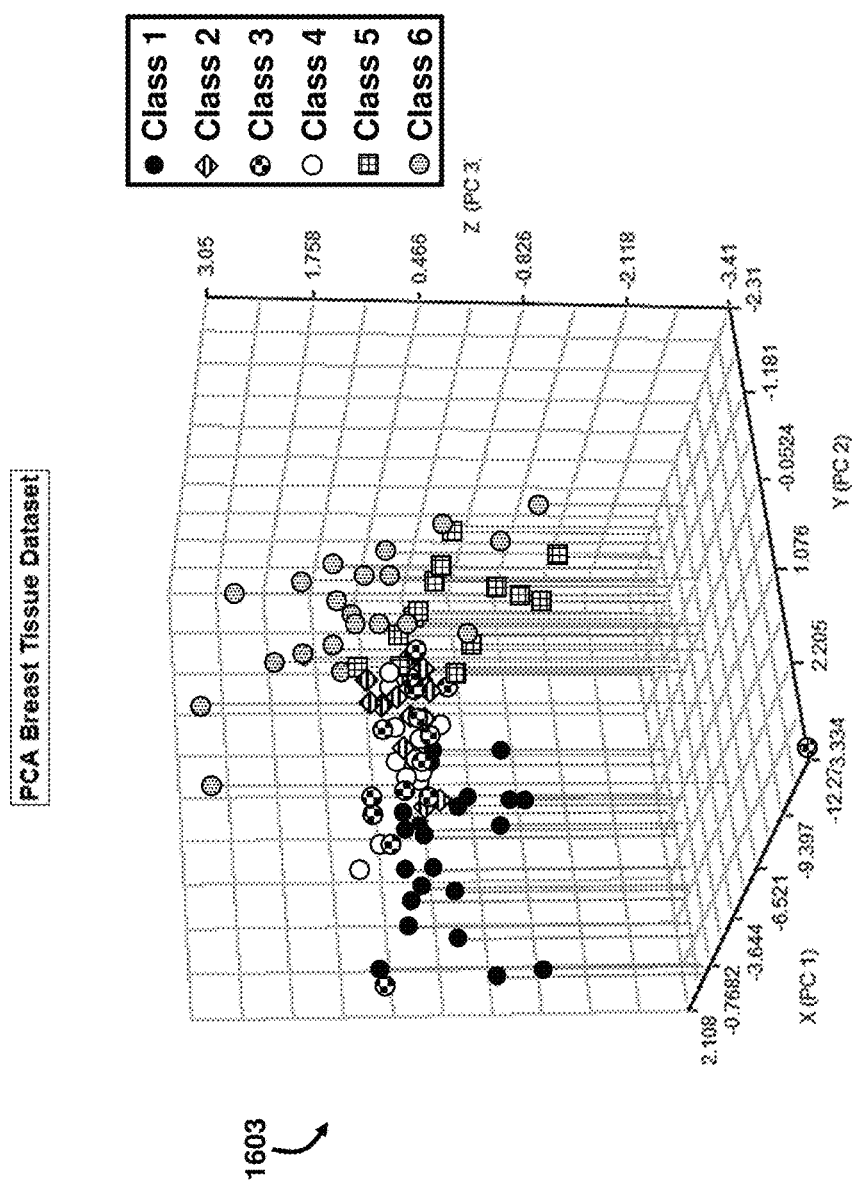
Figure 16C:
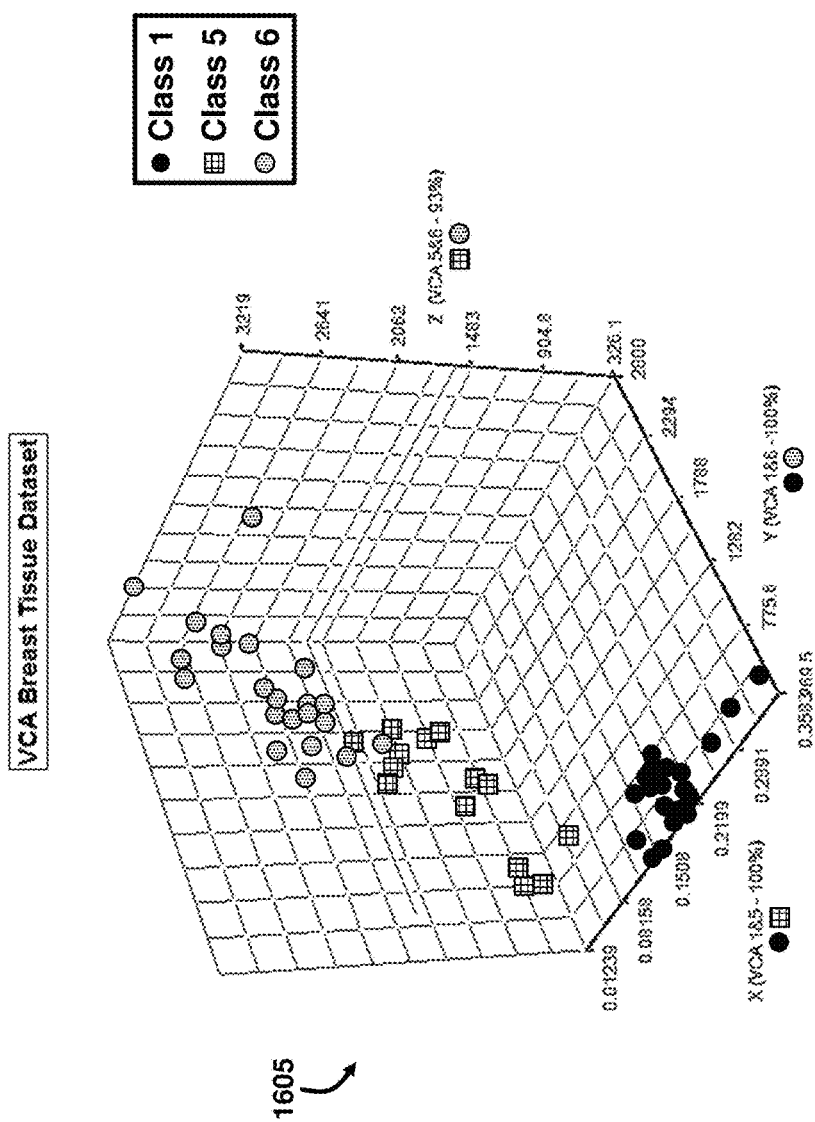
Figure 16D:
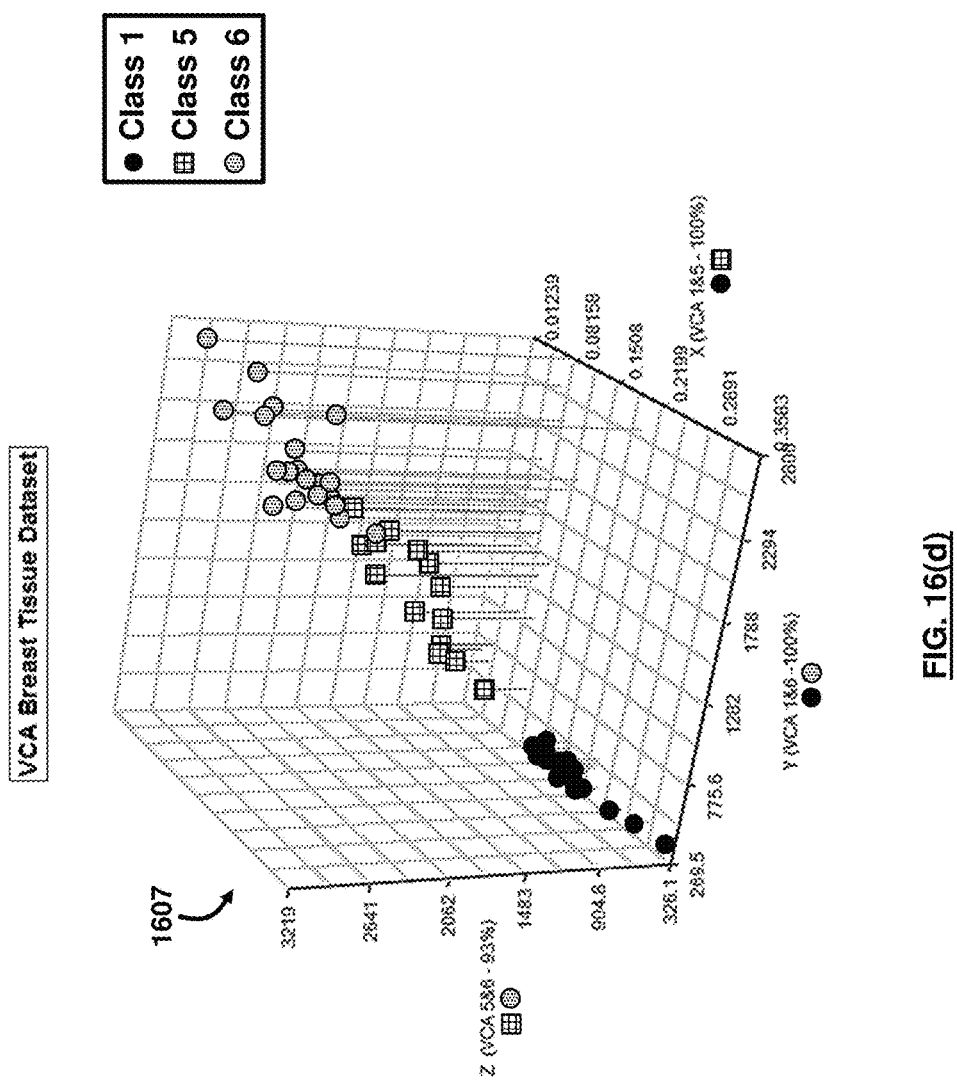
Figure 16E:
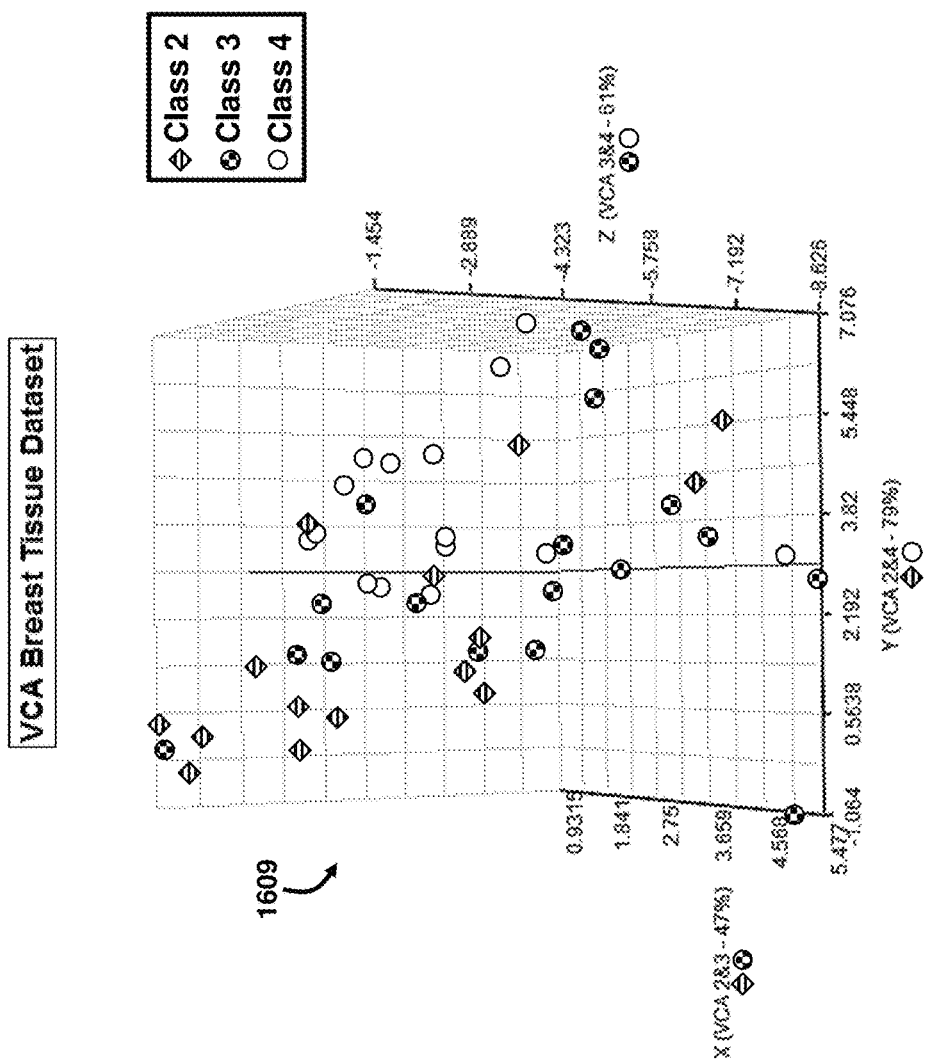
Figure 16F:
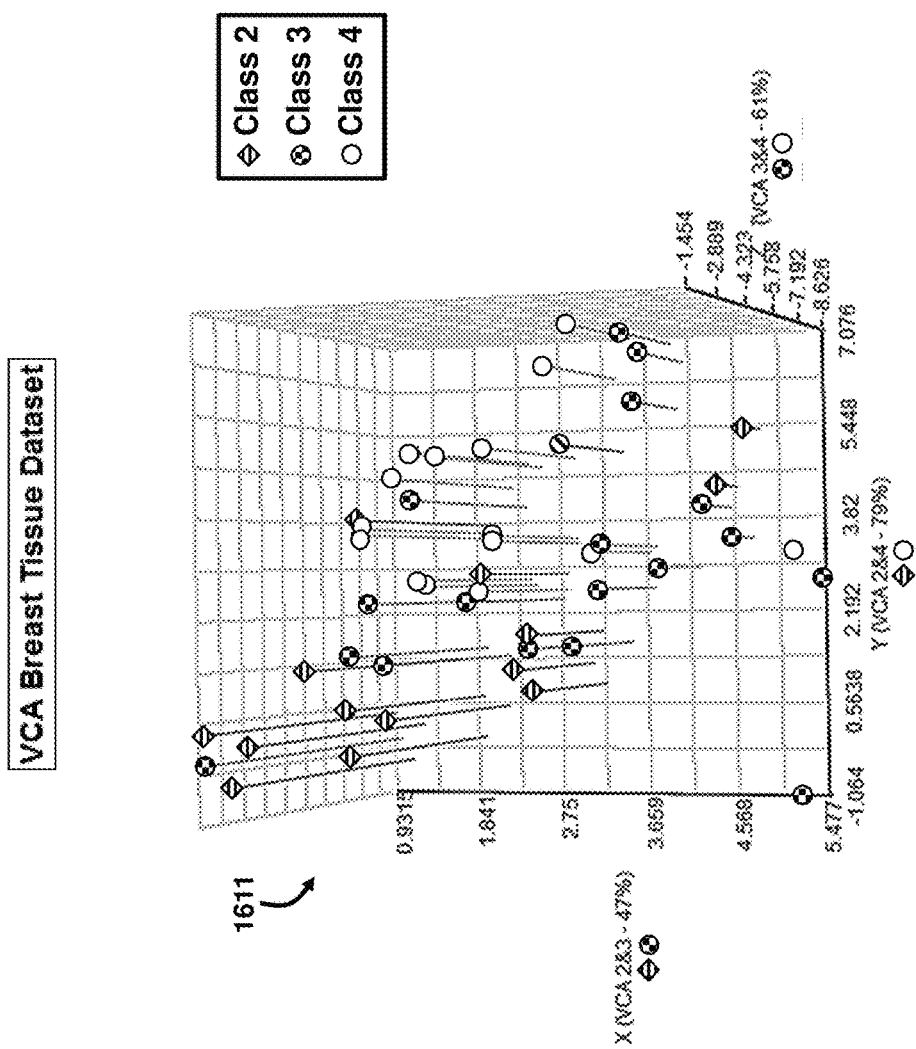

FIGS. 13(*a*) and 13(*b*) are 2D visualizations of the *E. coli* data set using the three principal components from PCA analysis. FIG. 13(*a*) shows a 2D plot 1301 of PC 1 vs. PC 2. The vertical line in the plot 1301 of FIG. 13(*a*) shows capability of PC 1 to only separate two classes (Class 2 and Class 4) from the other three classes (Class 1, Class 3 and Class 5). The horizontal line in the plot 1301 of FIG. 13(*a*) shows the capability of PC 2 to only separate two classes (Class 3 and Class 5) from the other three classes (Class 1, Class 2 and Class 4). FIG. 13(*b*) shows a 2D plot 1303 of PC 1 vs. PC 3. The vertical line (FIG. 13(*b*)) shows the capability of PC 1 to only separate two classes (Class 2 and Class 4) from the other three classes (Class 1, Class 3 and Class 5). There is no horizontal line in the plot 1303 of FIG. 13(*b*) because PC 3 does not show any capability in separation of different classes. FIGS. 12(*a*) through 12(*f*) show clear and easy to understand separation between different classes in the *E. coli* data set compared to the conventional PCA in FIGS. 13(*a*) and 13(*b*) which is very challenging with no clear separations between classes.

FIGS. 14(*a*) through 14(*f*) are 3D visualizations of the *E. coli* data set using the pairs-hyperspace (VCA 1&2, VCA 1&3 . . . VCA 4&5) from embodiments herein (steps 3-5 in FIG. 1) that was processed using the technique described in U.S. Pat. No. 8,982,131, the disclosure of which is incorporated herein by reference, to display it down into 3D space and compared to 3D space from PCA analysis of prior art as well as to 3D space from top variables analysis (step 2 FIG. 1). The plots 1401, 1403 of FIGS. 14(*a*) and 14(*b*), respectively, are of the same 3D space but at different angle or rotation, same as the plots 1405, 1407 of FIGS. 14(*c*) and 14(*d*), respectively, and the same as the plots 1409, 1411 of FIGS. 14(*e*) and 14(*f*), respectively. FIGS. 14(*a*) and 14(*b*) show clear separation between 5 different classes compared to other 3D spaces of FIGS. 14(*c*)-(*f*), which provide for fully separated classes of the five different sets of proteins in the cellular sites of *E. coli* data set.

FIGS. 15(*a*) through 15(*h*) are plots illustrating 2D visualizations of the breast tissue data set using the pairs-hyperspace (VCA 1&2, VCA 1&3 . . . VCA 5&6) from the embodiments herein (steps 3-5 in FIG. 1). FIG. 15(*a*) shows a 2D plot 1501 of VCA 1&2 vs VCA 1&3. The vertical line in FIG. 15(*a*) shows how the two classes (e.g., Class 1 and Class 2) are nearly separated (DS90-93%) by the x-axis (VCA 1&2). The horizontal line in FIG. 15(a) shows how the two classes (e.g., Class 1 and Class 3) are semi separated (DS90=78%) by the y-axis (VCA 1&3). The x-y plane generated by the two VCAs (VCA 1&2 and VCA 1&3) has one class in common and that is Class 1. Class 1 occupies the center of the 2D plane (x-y plane) generated by VCA 1&3 and VCA 1&3 while Class 2 and Class 3 occupy either on top of the x-y plane or bottom of the x-y plane or same space if they are inseparable. The plot 1503 of FIG. 15(b) shows that Class 2 and Class 3 are inseparable, because Class 2 occupies same space as of Class 3, (DS90=47%). It also means that the raw variables in the dataset are not fit to separate those two classes (e.g., Class 2 and Class 3). This helps in discovering new variables that will increase the separation between those two classes (VCA2&3). The vertical line in the plot 1503 of FIG. 15(b) shows how the two classes (e.g., Class 1 and Class 2) are nearly fully separated (DS90=93%) by the x-axis (VCA 1&2). There is no horizontal line in the plot 1503 of FIG. 15(b) because the two classes (Class 2 and Class 3) are nearly inseparable (DS947%) by the y-axis (VCA 2&3). The other classes (e.g., Classes 4, 5 and 6) are not shown here because they are located perpendicular to the 3D space of VCA1&2, VCA1&3, and VCA2&3. The plot 1505 of FIG. 15(c) and plot 1507 of FIG. 15(d) show the 3D space of Class 1, Class 4, and Class 5 using the 2D format approach as of FIGS. 15(a) and 15(b). From FIGS. 15(c) and 15(d), it is clear that the three classes (e.g., Classes 1, 4, and 5) are fully separated (DS90=100% for VCA 1&4, VCA 1&5 and VCA 4&5) and there is no need for future new variables. The plots 1509, 1511 of FIGS. 15(e) and 15(f), respectively, show the 3D space of Class 1, Class 5, and Class 6 using the 2D format approach of FIGS. 15(a) and 15(b). From FIGS. 15(e) and 15(f), it is clear that the three classes (e.g., Classes 1, 5, and 6) are nearly fully separated (DS90=100% for VCA 1&5, VCA 1&6 and DS90=93% for VCA 5&6) and there is probably no need for future new variables to increase VCA 5&6 from 93% to 100% (within experimental statistical error). The plots 1513, 1515 of FIGS. 15(g) and 15(h), respectively, show the 3D space of Class 2, Class 3, and Class 4 using the 2D format approach of FIGS. 15(a) and 15(b). From FIGS. 15(g) and 15(h), it is clear that the three classes (e.g., Classes 2, 3, and 4) are hard to separate using raw variables in dataset (DS90=47% for VCA 2&3, DS90=61% for VCA 3&4 and DS90=79% for VCA 2&4) and there is a need for new variables to increase the separation in VCA 2&3 and VCA 3&4.

FIGS. 16(a) through 16(f) are plots illustrating 3D visualizations of the breast tissue data points. The plots 1601, 1603, 1605, 1607, 1609, 1611 of FIGS. 16(e) and 16(f), respectively, show the 3D space using PCA (plots 1601 and 1603) with all six classes, and 3D space using the 2D format approach of FIGS. 15(a) to 15(h). From the prior art plots 1601, 1603 of FIGS. 16(a) and 16(b), it is clear the 3D plot that the three classes (e.g., Classes 2, 3 and 4) are inseparable while the other two classes (e.g., Classes 5 and 6) are semi-separable. From the plots 1605, 1607 of FIGS. 16(c) and 16(d), respectively, of the embodiments herein using Pairs' space, it is clear from the 3D plots that the three classes (e.g., Classes 1, 5, and 6) are fully separated and each class occupies a unique space. From plots 1609, 1611 of FIGS. 16(e) and 16(f), respectively, of the embodiments herein using Pairs' space, it is clear from the 3D plots that the two classes (e.g., Classes 2 and 3) are inseparable while the Class 4 is semi-separable from Class 2 but not as much visible separation from Class 3. For Classes 2 and 3 and Classes 3 and 4, the original nine variables fail to separate the two pairs (2&3 and 3&4). It is possible that the three classes are a result of degenerative process that starts from Class 4 and proceeds to Class 3 and further proceed to Class 2. This explains why a semi-separation is observed between Classes 2 and 4 (vertical line on FIG. 16(e)). Class 4 is for the normal "glandular" breast tissue. Class 3 is composed of cyst "Mastopathy" tissue, and both are found in the presence of benign cysts or noncancerous lumps. Class 2 is the non-deadly tumor "fibro-adenoma". This may also explain the satisfactory separation between Classes 2 and 4; these classes are very different in nature. Class 4 tissue is normal gland tissue, and Class 2 is a fully developed stage of non-deadly breast tumor. This analysis was arrived without the necessity of analyzing extensive experimental point plots and determining what percentage from a visual perspective constituted the separation of the fifteen pairs of classes.

The embodiments herein provide several features including: (1) Any axis separating the two classes or clusters in the NPD space has the highest DS90. (2) The number of dimension is equal to number of VCAs or the number of pairs (NP) of classes. (3) The dimension of number of pairs (NP-D) is a hyperspace where all classes or clusters are separated from each other. Each 3D space contains only three classes or clusters. (4) There is no adjustment in the data point boundaries of any of the classes in the data set to fit user-defined criteria. (5) No Gaussian fit or any other fitting to the data points is used. No conventional estimations or biases. The values for any axis for each pair of classes or clusters are not score or arbitrary values, but rather their origin is clear with distinct knowledge of the original variables as to how they contributed to construct each pair's axis (VCA). (6) Each VCA axis can generate a list of data points between the two classes that are in the overlap regions where false rate is high. (7) Mathematical transformation of complex/overlapping data points of classes or clusters in N-D space down to simple/highly separated pair of two-classes at a time space domain. This will allow unknown data points to be easily categorized and identified reliably with an accurate measure of confidence. (8) The method transforms and separates classes or clusters to NPD-dimensional (NP-D) space down to pair of classes and 1-D space where it is human intuitive and easy to see and understand. (9) The embodiments herein include the step of acquiring N-D to 1D transformation for each pair of classes in the data set. Multivariate data is reduced to 1-D data points for each two classes or clusters at a time. The user can use two of the 1-D data points (two VCAs) to build a 2-D presentation, or three of the 1-D data points (three VCAs) to build a 3-D presentation. (10) The method provided by the embodiments herein does not require a starting point such as some of the conventional MVA methods. These include trial and error numerical values, default values in algorithms, and assumptions that affect the algorithms. (11) There is no human intervention whatsoever or user-defined threshold values to enter or outside bias or intervention or user-defined thresholds or decisions. A unit-length condition is not imposed on the length of any variable of the original N-D space. No pre-processing or massaging of the raw data is necessary such as most of the prior art statistical methods rely upon. There are no search functions that are run for long time until steady state is reached or until it is otherwise terminated by the user. (12) The embodiments herein simplify the separation between classes or clusters in the N-D space of original data set down to one-axis for pair of classes with the power of diagnostics, predictions, probability rate, sensitivity and specificity.

In an exemplary embodiment, the various devices described herein and illustrated in the figures, for example systems and devices illustrated in FIG. 1 comprise embodied as hardware-enabled modules and may be configured as a plurality of overlapping or independent electronic circuits, devices, and discrete elements packaged onto a circuit board to provide data and signal processing functionality within a special-purpose computer. An example might be a comparator, inverter, or flip-flop, which could include a plurality of transistors and other supporting devices and circuit elements. The modules that are configured with electronic circuits process computer logic instructions capable of providing digital and/or analog signals for performing various functions as described herein. The various functions can further be embodied and physically saved as any of data structures, data paths, data objects, data object models, object files, database components. For example, the data objects could be configured as a digital packet of structured data. The data structures could be configured as any of an array, tuple, map, union, variant, set, graph, tree, node, and an object, which may be stored and retrieved by computer memory and may be managed by processors, compilers, and other computer hardware components. The data paths can be configured as part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and can be a variable, a data structure, or a function. In the embodiments configured as relational databases (e.g., such Oracle® relational databases), the data objects can be configured as a table or column. Other configurations include specialized objects, distributed objects, object oriented programming objects, and semantic web objects, for example. The data object models can be configured as an application programming interface for creating HyperText Markup Language (HTML) and Extensible Markup Language (XML) electronic documents. The models can be further configured as any of a tree, graph, container, list, map, queue, set, stack, and variations thereof. The data object files are created by compilers and assemblers and contain generated binary code and data for a source file. The database components can include any of tables, indexes, views, stored procedures, and triggers.

Some components of the embodiments herein can include a computer program product configured to include a pre-configured set of instructions stored in non-volatile memory, which when performed, can result in actions as stated in conjunction with the methods described above. For example steps 16 of FIG. 1 may be configured as a computer program product containing a pre-configured set of instructions that can be stored on a tangible non-transitory computer readable medium or a program storage device. In an example, the tangible non-transitory computer readable medium can be configured to include the set of instructions, which when performed by the device 14, can cause the device 14 to perform acts described above.

The embodiments herein may also include tangible and/or non-transitory computer-readable storage media for carrying or having computer executable instructions or data structures stored thereon. Such non-transitory computer readable storage media can be any available media that can be accessed by a special purpose computer, including the functional design of any special purpose processor, module, or circuit as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments.

Generally, program modules include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor, and may be configured, for example, as a kiosk.

The embodiments herein can include both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 17:
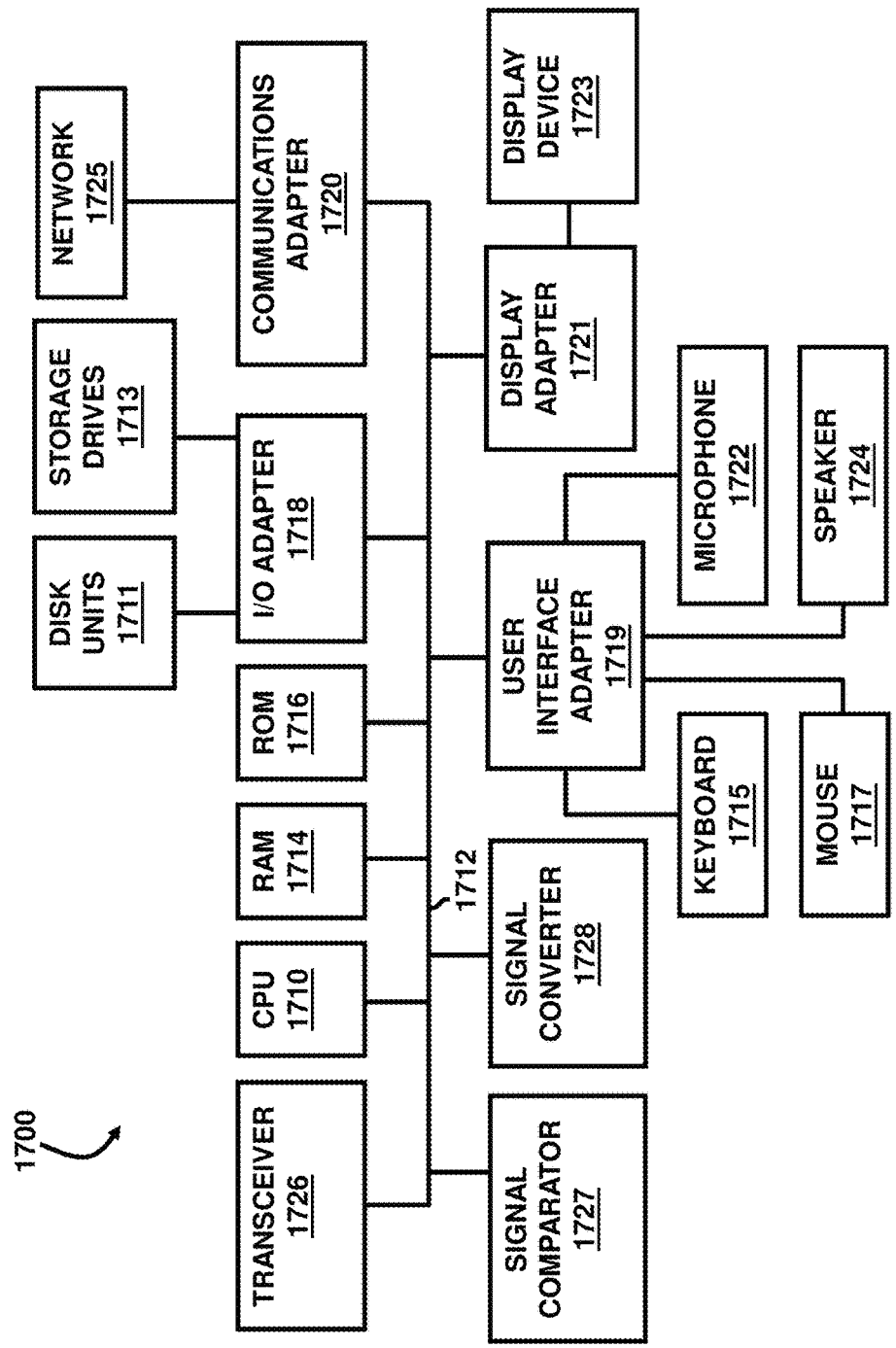
FIG. 17 illustrates a computer system used in accordance with the embodiments herein.

A representative hardware environment for practicing the embodiments herein is depicted in FIG. 17, with reference to FIGS. 1 through 16(*f*). This schematic drawing illustrates a hardware configuration of an information handling/computer system 1700 in accordance with an exemplary embodiment herein. The system 1700 comprises at least one processor or central processing unit (CPU) 1710. The CPU 1710 is interconnected via system bus 1712 to various devices such as a random access memory (RAM) 1714, read-only memory (ROM) 1716, and an input/output (I/O) adapter 1718. The I/O adapter 1718 can connect to peripheral devices, such as disk units 1711 and storage drives 1713, or other program storage devices that are readable by the system. The system 1700 can read the inventive instructions on the program storage devices and follow these instructions to execute the methodology of the embodiments herein. The system 1700 further includes a user interface adapter 1719 that connects a keyboard 1715, mouse 1717, speaker 1724, microphone 1722, and/or other user interface devices such as a touch screen device (not shown) to the bus 1712 to gather user input. Additionally, a communication adapter 1720 connects the bus 1712 to a data processing network 1725, and a display adapter 1721 connects the bus 1712 to a display device 1723 which may be embodied as an output device such as a monitor, printer, or transmitter, for example. Further, a transceiver 1726, a signal comparator 1727, and a signal converter 1728 may be connected with the bus 1712 for processing, transmission, receipt, comparison, and conversion of electric or electronic signals.

The embodiments herein relates generally to a multivariate digital separation and display device and method for generating pictures of fully separated data points of different classes (groups or clusters) in hyperspace. The pictures of the points of different classes in hyperspace are generated by using an input device 12, a computer processor 14, and output devices 18, 20, 22 to produce 2D and 3D representations (pictures) of the data set with classes (clusters) nearly fully separated from each other. Overlapping classes (clusters or groups) in the hyperspace data set are further separated by a new methodology which attempts to reach full separation between classes. A new multivariate data analysis method is presented for increasing the separation between classes in hyperspace that may lead to 100% separation between classes.

As an example, when used in the medical field, the embodiments herein involve finding a mathematical transformation that does not rely on any user-input, prior modeling, use of any models, use of any human driven-neural network protocols, or any human intervention. These mathematical transformations, when applied to the data set that has been gathered for an individual patient, result in a highly accurate diagnosis of their disease state or states, inasmuch as the acquired data were relevant factors in determining the presence or absence of such states (see breast cancer data set analysis described above). The embodiments herein reduce as well as transform the original data dimensionality to a new straightforward dimensionality (classes' dimensionality) that is easy to observe, display and analyze by even a layman person.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A multivariate digital separation and display system for generating visible pictures from an original hyperspace data set by reducing said hyperspace data set to a two-dimensional and/or three-dimensional rendering, said system comprising:
   an input device for receiving said hyperspace data set with multiple classes (m-classes);
   a computer processor for receiving said hyperspace data set from said input device and maximizing a separation between said classes and projecting said classes into a pairs-hyperspace that can be visualized; and
   a 2D and/or 3D output device for producing a representation of said pairs-hyperspace that can be visualized, wherein said computer processor is configured to performs the steps of:

(a) constructing a pairs-matrix from said original hyperspace data set comprised of points of multiple classes in hyperspace;

(b) evaluating a percent degree of separation for each available variable of each pair of classes in said original hyperspace data set;

(c) sorting said variables based on their degree of separation from a maximum to a minimum for each pair of classes;

(d) calculating a maximum degree of separation of each pair of classes by combining only contributing variables, wherein combining said contributing variables will increase the degree of separation beyond the maximum for any variable in step (c), wherein data from step (d) may be transmitted to a 2D output device for visual presentation of pairs-hyperspace data, and;

(e) when generating a 3D rendering performing the step of transforming said hyperspace data set of n-dimension and m-classes to a pairs-dimension using the calculated maximum degree of separation determined in step (d), and transmitting data from step (e) to a 3D output device for 3D graphical presentation of data points in 3D space for any of three classes of interest, and;

wherein said 2D output device and/or said 3D output device generates visible pictures from said original hyperspace data set.

2. The system of claim 1, wherein said input device comprises any of a keyboard, a laboratory instrument, a reader of computer readable media, and a network device.

3. The system of claim 1, wherein said output device comprises any of a 2D printer and a 3D printer.

4. The system of claim 1, wherein said output device comprises a display monitor.

5. The system of claim 1, wherein n-dimension represents a number of variables.

6. The system of claim 1, wherein said pairs-dimension comprises a number of axes and equals a number of pairs equaling $m(m-1)/2$.

7. The system of claim 1, wherein said visual presentation on a 2D output device comprises a graphical presentation list of all pairs of clusters and corresponding degree of separations using a single variable and a combination of contributing variables.

* * * * *